(12) United States Patent
Soli

(10) Patent No.: US 10,243,752 B2
(45) Date of Patent: Mar. 26, 2019

(54) SOCIAL MEDIA SYSTEM AND METHOD

(71) Applicant: HOOLEY LLC, Los Angeles, CA (US)

(72) Inventor: Giancarlo George Soli, Los Angeles, CA (US)

(73) Assignee: Hooley LLC, Los Angeles, CA (US)

( * ) Notice: Subject to any disclaimer, the term of this patent is extended or adjusted under 35 U.S.C. 154(b) by 69 days.

(21) Appl. No.: 15/332,356

(22) Filed: Oct. 24, 2016

(65) Prior Publication Data
US 2017/0118034 A1     Apr. 27, 2017

Related U.S. Application Data

(60) Provisional application No. 62/245,866, filed on Oct. 23, 2015.

(51) Int. Cl.
| | | |
|---|---|---|
| H04L 12/18 | (2006.01) | |
| H04L 29/08 | (2006.01) | |
| H04W 4/021 | (2018.01) | |
| H04L 12/58 | (2006.01) | |

(52) U.S. Cl.
CPC ...... *H04L 12/1818* (2013.01); *H04L 12/1831* (2013.01); *H04L 51/32* (2013.01); *H04L 67/26* (2013.01); *H04L 67/306* (2013.01); *H04W 4/021* (2013.01)

(58) Field of Classification Search
CPC .................................. H04W 4/21; H04L 67/10
See application file for complete search history.

(56) References Cited

U.S. PATENT DOCUMENTS

| | | |
|---|---|---|
| 7,848,765 B2 | 12/2010 | Phillips et al. |
| 8,606,872 B1 | 12/2013 | Reitnour et al. |
| 8,666,436 B2 | 3/2014 | Ellanti et al. |
| 8,832,301 B2 | 9/2014 | Graff et al. |

(Continued)

FOREIGN PATENT DOCUMENTS

CN     102664819     9/2012

*Primary Examiner* — Philip J Chea
*Assistant Examiner* — Mohammed Ahmed
(74) *Attorney, Agent, or Firm* — Martin & Ferraro, LLP

(57) ABSTRACT

A system and method of allowing guests of events to interact with other guests of the events. A user of an event system may log into the event system and create a user profile to be utilized in the event system. The user may create an event with the event system. The event may include a geo-fence surrounding a location of the event, which may be customized by the user of the event system. The event may be a public event or a private event. The user of the event system may create an event poster of the event, which may include details of the event, the location of the event, the ability to invite other users of the event system to the event, and the ability to bookmark the event. The user of the event system may invite the other users of the event system to be guests of the event. The geo-location of the guests of the event may also be determined. The guests of the event may be allowed to access features of the event, which may include direct messaging, guest profiles, and friend requests when the geo-location of the guests is within the geo-fence of the event. The features of the event may include direct messaging, guest profiles, and friend requests. The media content of the guests of the event being organized into galleries.

15 Claims, 36 Drawing Sheets

(56) References Cited

U.S. PATENT DOCUMENTS

| | | |
|---|---|---|
| 9,208,506 B2 | 12/2015 | Geer |
| 9,747,285 B1 | 8/2017 | Laufer |
| 2013/0232194 A1 | 9/2013 | Knapp et al. |
| 2014/0101248 A1 | 4/2014 | Felder et al. |
| 2014/0280526 A1* | 9/2014 | Filho ..................... H04W 4/21 709/204 |
| 2015/0006637 A1* | 1/2015 | Kangas ................. H04L 67/10 709/204 |
| 2015/0019523 A1 | 1/2015 | Lior et al. |
| 2015/0269531 A1 | 9/2015 | Menayas et al. |
| 2015/0271126 A1 | 9/2015 | Menayas et al. |

\* cited by examiner

1) Login

2) Home (Dashboard)

a) Weekly Created events

-> weekly created 'Hooley Now' and 'Customize' events.

b) Live Events on Map    332

-> Live events on Map with marker.

c) Monthly new users

-> New registered users show with different color line with different registration method like 'facebook', 'twitter', 'google plus' and 'manual registred' d) Latest new users

-> Recently registered new users with profile picture and name a) Event guest list:

→ can view listing with event user status like 'Invited', 'Registered', 'On the way', 'Here now', 'Gone'

FIG. 9 b) Hooley Invites listing:

FIG. 10

A) *Terms: can edit terms with the help of editor* 361

B) *Policy: can edit policy with the help of editor* 362

C) FAQ: can edit 'faq' with the help of editor  363

D) About version: can edit 'about version' with the help of editor  364

4) Event

-> *Listing of events:*

-> *can change Event visibility (public, private)*

-> *can change Event is Paid/Free*

-> *can view bookmarked*

-> *can view media count with 'Event name', 'Comments count', 'Like count' and 'favourite count'*

-> *can delete event*

3) Event Poster

*-> Listing of event posters ; can edit and upload multiple poster pictures and choose default picture.*

6) Event Media

-> Listing of event media:

-> can view uploaded image by user for particular event

-> can view count of 'comments', 'likes' and 'favourite'

-> can delete image or video

7) App Users

-> Listing of app users:

-> can view detail of registered app users.

-> can view profile image

-> can active/deactive user

-> can delete users

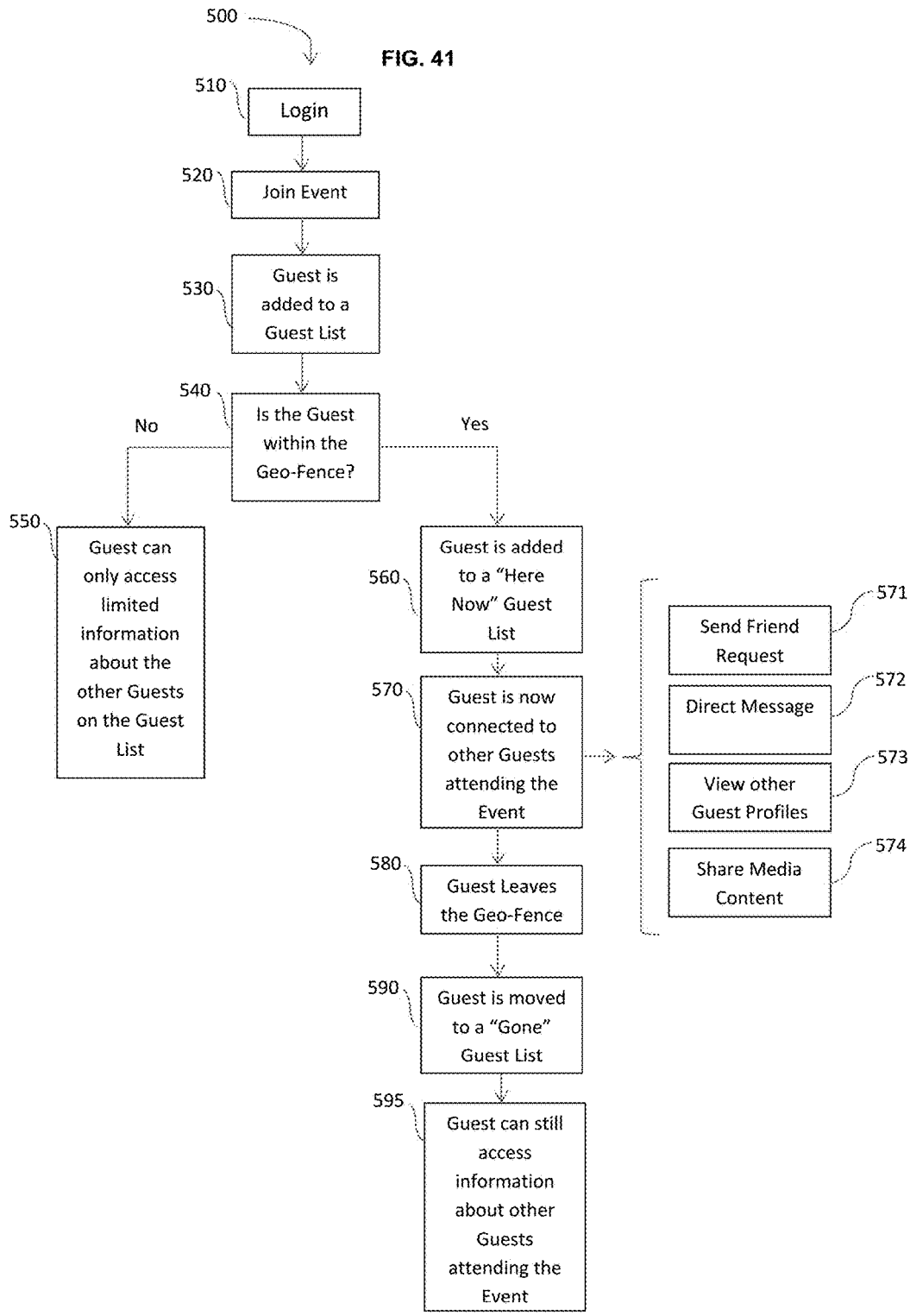

SOCIAL MEDIA SYSTEM AND METHOD

This application claims priority to U.S. Provisional Patent Application No. 62/245,866 filed Oct. 23, 2015; all of which is incorporated by reference herein in its entirety.

FIELD OF THE INVENTION

In general, the present invention relates to a system and method for consumer engagement technology that combines elements of social media platforms, along with unique features by utilizing geo-location technology.

BACKGROUND OF THE INVENTION

In the field of event planning, it is important for guests to be able to interact with one another through social media. Guests may want to share their pictures and videos with each other to celebrate a particular moment. However, there may be events where exclusivity is to be a factor and where information is not to be disseminated to the general public, but to only those people that are present at the event. Unfortunately, in most cases, conventional social media applications employ simple algorithms to share information with "friends."

Therefore, there exists a need for a system that can determine whether a person is invited to an event, determine the person's location, and share information between the person and other participants at the event in an efficient manner.

SUMMARY OF THE INVENTION

The present invention in an embodiment contemplates a method of allowing guests of events to interact with other guests of the events, the method includes logging, by a user of an event system, into the event system, creating, by the user of the event system, a user profile to be utilized in the event system, creating, by the user of the event system, an event, the event including a geo-fence surrounding a location of the event, customizing, by the user of the event system, the event to be a public event or a private event, the customizing of the event includes customizing a name of the event, a start time, an end time, and a date of the event, creating, by the user of the event system, an event poster of the event, the event poster including details of the event, a location of the event, an ability to invite other users of the event system to the event, and an ability to bookmark the event, inviting, by the user of the event system, the other users of the event system to be guests of the event, determining a geo-location of the guests of the event, allowing the guests of the event to access features of the event when the guests enter the geo-fence of the event, the features of the event include direct messaging, guest profiles, and friend requests, receiving media content from the guests of the event, the media content including videos, images, and messages, and organizing the media content into galleries for access by the guests of the event.

In an alternative embodiment, the method includes the event system being stored on a virtual machine of a server; continuing to allow the guests of the event to access the features of the event after the guests of the event have left the geo-fence of the event; compiling status information of the guests of the event to determine which of the guests of the event have been invited, registered, "On The Way," "Here Now," and "Gone;" the event being open to the public and begins at the creation of the event, the geo-location of the event being around a current geo-location of the user; and live streaming information about the event to the guests of the event.

The present invention in another embodiment contemplates a non-transitory computer-readable medium including code for performing a process to allow guests of events to interact with other guests of the events to be executed on a computer, the process includes logging, by a user of an event system, into the event system, creating, by the user of the event system, a user profile to be utilized in the event system, creating, by the user of the event system, an event, the event including a geo-fence surrounding a location of the event, customizing, by the user of the event system, the event to be a public event or a private event, the customizing of the event includes customizing a name of the event, a start time, an end time, and a date of the event, creating, by the user of the event system, an event poster of the event, the event poster including details of the event, a location of the event, an ability to invite other users of the event system to the event, and an ability to bookmark the event, inviting, by the user of the event system, the other users of the event system to be guests of the event, determining a geo-location of the guests of the event, allowing the guests of the event to access features of the event when the guests enter the geo-fence of the event, the features of the event include direct messaging, guest profiles, and friend requests, receiving media content from the guests of the event, the media content including videos, images, and messages, and organizing the media content into galleries for access by the guests of the event.

In an alternative embodiment, the non-transitory computer-readable medium includes the event system being stored on a virtual machine of a server; continuing to allow the guests of the event to access the features of the event after the guests of the event have left the geo-fence of the event; compiling status information of the guests of the event to determine which of the guests of the event have been invited, registered, "On The Way," "Here Now," and "Gone;" the event being open to the public and begins at the creation of the event, the geo-location of the event being around a current geo-location of the user; and live streaming information about the event to the guests of the event.

The present invention in yet another embodiment contemplates a system for allowing guests of events to interact with other guests of the events, the system includes at least one server, the at least one server including: a hard drive; and a processor, the processor being configured to: log, by a user of an event system, into the event system, create, by the user of the event system, a user profile to be utilized in the event system, create, by the user of the event system, an event, the event including a geo-fence surrounding a location of the event, customize, by the user of the event system, the event to be a public event or a private event, the customizing of the event includes customizing a name of the event, a start time, an end time, and a date of the event, create, by the user of the event system, an event poster of the event, the event poster including details of the event, a location of the event, an ability to invite other users of the event system to the event, and an ability to bookmark the event, invite, by the user of the event system, the other users of the event system to be guests of the event, determine a geo-location of the guests of the event, allow the guests of the event to access features of the event when the guests enter the geo-fence of the event, the features of the event include direct messaging, guest profiles, and friend requests, receive media content from the guests of the event, the media content including videos, images, and messages, and organize the media content into galleries for access by the guests of the event.

In an alternative embodiment, the system includes the event system being stored on a virtual machine of the at least one server; the processor being further configured to continue to allow the guests of the event to access the features of the event after the guests of the event have left the geo-fence of the event, and compile status information of the guests of the event to determine which of the guests of the event have been invited, registered, "On The Way," "Here Now," and "Gone;" the event being open to the public and begins at the creation of the event, the geo-location of the event being around a current geo-location of the user; and the processor being further configured to live stream information about the event to the guests of the event.

It is understood that both the foregoing general description and the following detailed description are exemplary and exemplary only, and are not restrictive of the invention as claimed.

BRIEF DESCRIPTION OF THE DRAWINGS

The accompanying drawings, which are incorporated in and constitute a part of the specification, illustrate preferred embodiments of the invention. Together with the description, they serve to explain the objects, advantages and principles of the invention. In the drawings:

FIG. 9 illustrates a graphical representation of an embodiment of a guest list;

FIG. 10 illustrates a graphical representation of an embodiment of an invitation listing;

FIG. 15 illustrates a graphical representation of an embodiment of a listing of events;

FIG. 16 illustrates a graphical representation of an embodiment of an event poster;

FIG. 41 illustrates an embodiment of a flow diagram of a method for a guest.

DETAILED DESCRIPTION

Figure 1:
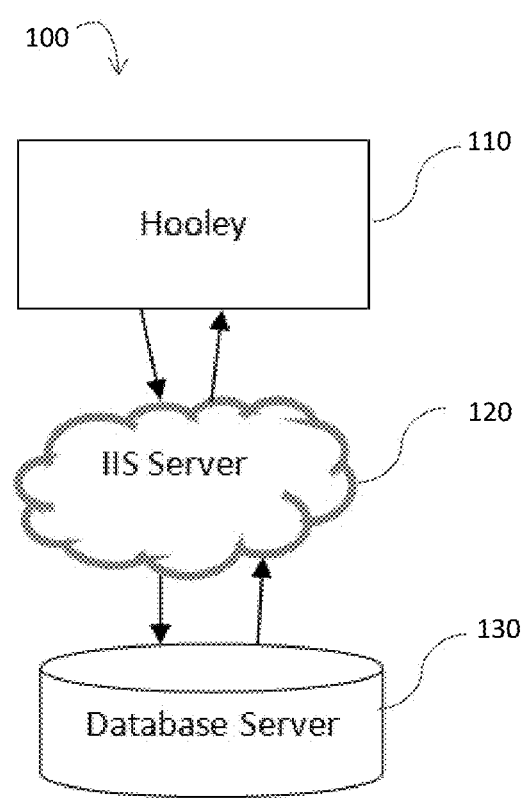
FIG. 1 illustrates a schematic view of one embodiment of a Hooley System that utilizes a server system.

Reference now will be made in detail to embodiments, one or more examples of which are illustrated in the drawings. Each example is provided by way of explanation of the embodiments, not limitation. In fact, it will be apparent to those skilled in the art that various modifications and variations can be made to the embodiments without departing from the scope or spirit of the embodiments. For example, features illustrated or described as part of one embodiment can be used with another embodiment to yield a still further embodiment. Thus, it is intended that the present subject matter cover such modifications and variations as come within the scope of the appended claims and their equivalents.

In the detailed description of embodiments that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 2:
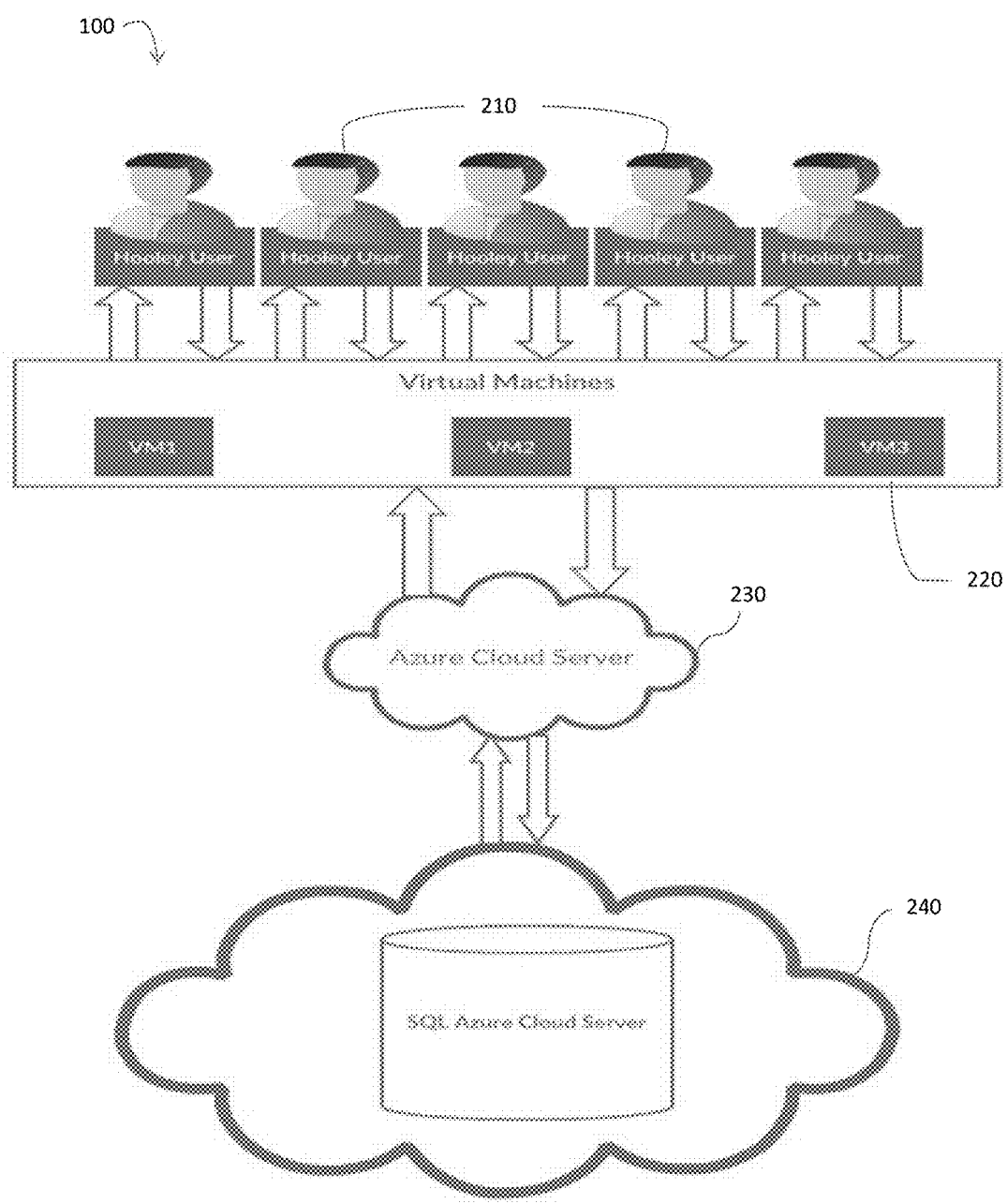
FIG. 2 illustrates a schematic view of another embodiment of the Hooley System that utilizes a server system.

Referring now to FIG. 1, one embodiment of the Hooley System 100 for utilizing a geo-location of a user is illustrated in accordance with aspects of the present subject matter. In FIG. 1, the system may include a client-server architecture where a server 130 communicates with one or more client devices 110, such as a local client device, over a network 120. The server 130 may generally be any suitable computing device, such as a remote web server(s), a cloud server(s), or a local server(s), and/or any suitable combination of computing devices. For example, the server 130 may be implemented as a parallel or distributed system in which two or more computing devices act together as single server. In FIG. 2, an example of virtual machines 220, a cloud server 230, and a server 240 of the Hooley System 100 is shown. An example of the server 240 may include a structured query language (SQL) azure cloud server. An example of the cloud server 230 may include an azure cloud server.

Similarly, the client device 110 may generally be any suitable computing device(s), such as a laptop(s), desktop(s), smartphone(s), tablet(s), mobile device(s), wearable computing device(s), a display with one or more processors coupled thereto and/or embedded therein, and/or any other computing device(s). In FIG. 2, although only five client devices 210 (e.g., Hooley users) are illustrated, it should be appreciated that any number of clients may be connected to the server 240 over the network 230.

In several embodiments, the server 130 may host a geographic information system (GIS), such as a mapping application (e.g., the Google Maps mapping services provided by Google Inc.), a virtual globe application (e.g., the Google Earth virtual globe application provided by Google Inc.), or any other suitable geographic information system. On the client side, the client device 110 may present a user interface that allows a user to interact with the GIS. For example, the user interface may be served through the network 120 or web-based application that is executed on the client device 110, such as a web browser, a thin client application, or any other suitable network or web-based application. The user interface may be served locally on the client device 110 or an internet information server (IIS). The server 130 may transmit asset data, such as satellite and/or aerial imagery and other geospatial data (e.g., terrain and vector data), over the network 120 to the client device 110. Upon receipt of this data, the client device 110 may render the asset data, via the user interface, in the form of a map (e.g., 2-D map or a 3-D map) that is displayed on a display device associated with the client device 110. A user may then access and/or interact with the map presented in the user interface. For example, the user may be allowed to move a user icon across the map displayed within the user interface in order to select a desired geographic location.

The server 130 may include a processor(s) and a memory. The processor(s) may be any suitable processing device, such as a microprocessor, microcontroller, integrated circuit, or other suitable processing device. Similarly, the memory may include any suitable computer-readable medium or media, including, but not limited to, non-transitory computer-readable media, RAM, ROM, hard drives, flash drives, or other memory devices. The memory may store information accessible by processor(s), including instructions that can be executed by processor(s) and data that can be retrieved, manipulated, created, or stored by processor(s). In several embodiments, the data may be stored in one or more databases.

The memory may include an asset database storing asset data associated with one or more geospatial assets capable of being served to the client device 110 by the server 130 (e.g., via the GIS). For example, the asset data may correspond to any suitable data or information associated with a given geospatial asset, such as image data, vector data, terrain data, layer data, search data and/or the like. Such asset data may include entity information associated with the geographic entities used to define specific geographic regions and/or locations within the geospatial asset. For example, the entity data may be organized or structured so that each geographic location within a specific geospatial asset is associated with a given set of geographic entities (e.g., a hierarchically ordered set of geographic entities for each location).

Additionally, as indicated above, the server 130 may, in several embodiments, be configured to host a GIS that allows the server 130 to communicate with a corresponding GIS client(s) running on the client device 110. Thus, in response to access requests transmitted by the client device 110, asset data associated with one or more geospatial assets, including satellite and/or aerial imagery, may be transmitted to and rendered by the client device 110 to allow a user to navigate and/or interact with the geospatial asset(s).

The instructions stored within the memory may be executed by the processor(s) to implement a geo-location module associated with the GIS. In general, the geo-location module may be configured to track the position of a user presented on the map as the icon is moved across the map in response to inputs provided by the user. Thus, by tracking the position of the user icon as it is moved relative to the map, the geo-location module may be configured to determine the current geographic location of the icon on the map. A textual representation identifying the current geographic location may then be provided for presentation to the user in order to assist the user in selecting a desired location.

It should be appreciated that, although the geo-location module is shown as being implemented by the server 130, one or more of the functions provided by the module may, in alternative embodiments, by implemented by the client device 110. For example, as indicated above, the asset data served to the client device 110 may include geographic entity data associated with the geographic locations included within the map displayed to the user. In such an embodiment, a geo-location module implemented by the client device 110 may be configured to track the position of an associated user icon as it is moved relative to the displayed map, thereby allowing for the client device 110 to present a location indicator to the user providing a textual representation of the current geographic location of the icon on the map.

It should also be appreciated that, although the geo-location module is shown as forming part of the hosted GIS, the geo-location module may, in other embodiments, be a stand-alone module or form part of any other suitable software package that utilizes data provided by the GIS to allow for one or more users to be geo-located. For example, in one embodiment, the geo-location module may form part of a software package designed to allow users to store, organize, and/or share their geo-location.

Moreover, it should be appreciated that, as used herein, the term "module" refers to computer logic utilized to provide desired functionality. Thus, a module may be implemented in hardware, application specific circuits, firmware, and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk, or optical or magnetic media.

The server 130 may also include a network interface for providing communications over the network 120. In general, the network interface may be any device/medium that allows the server 130 to interface with the network 120.

Similar to the server, the client device 110 may also include one or more processors and associated memory. The processor(s) may be any suitable processing device known in the art, such as a microprocessor, microcontroller, integrated circuit, or other suitable processing device. Similarly, the memory may be any suitable computer-readable medium or media, including, but not limited to, non-transitory computer-readable media, RAM, ROM, hard drives, flash drives, or other memory devices. As is generally understood, the memory may be configured to store various types of information, such as data that may be accessed by the processor(s) and instructions that may be executed by the processor(s). The data may generally correspond to any suitable files or other data that may be retrieved, manipulated, created, or stored by processor(s). In several embodiments, the data may be stored in one or more databases.

For example, the memory may include a database for storing data. This data may include, for example, a set of GPS coordinates corresponding to a selected location and/or the users.

Additionally, the instructions stored within the memory of the client device 110 may generally be any set of instructions that, when executed by the processor(s), cause the processor(s) to provide desired functionality. For example, the instructions may be software instructions rendered in a computer readable form or the instructions may be implemented using hard-wired logic or other circuitry. In several embodiments, suitable instructions may be stored within the memory for implementing one or more GIS clients, such as one or more earth-browsing clients and/or mapping clients, designed to render the asset data (including satellite and/or aerial imagery) associated with the geospatial assets available via the GIS. For example, the GIS client(s) may be configured to retrieve asset data from the server 130 and render such data in the form of a map(s) for display/use by the user. For example, a map displaying a portion of a geospatial asset may be presented to the user within a suitable user interface, which may then allow the user to identify a given location on the map for geo-locating.

Moreover, the client device 110 may also include a network interface for providing communications over the network 120. Similar to the interface for the server 130, the network interface may generally be any device/medium that allows the client device 110 to interface with the network 120.

It should be appreciated that the network 120 may be any type of communications network, such as a local area network (e.g., intranet), wide area network (e.g., Internet), or some combination thereof. The network 120 can also include a direct connection between the client device 110 and the server 130. In general, communication between the server 130 and the client device 110 may be carried via a network interface using any type of wired and/or wireless connection, using a variety of communication protocols (e.g., TCP/IP, HTTP, SMTP, FTP), encodings or formats (e.g., HTML, XML), and/or protection schemes (e.g., VPN, secure HTTP, SSL).

In FIG. 2, an example of the virtual machines 220 of the Hooley System 100 is shown. The virtual machines 220 are software implemented versions of computing devices. The resources used in the virtual machine 220, however, correspond to physical resources on a computing device. For example, a one or more processors in the virtual machine 220 may correspond to one or more real processors on a real computer. However, this may not be a 1:1 relationship. The ability to create software implemented versions of computers may allow for several of the virtual machines 220 to operate on the same physical computer. This may be desirable because it allows for conservation of resources on a physical computer. When one or more of the virtual machines 220 are inactive, one or more other virtual machines 220 may be active, and thus, the use of the virtual machines 220 may allow for better utilization of the physical resources of a computer.

Virtual machine architecture includes a virtual machine 220 and a virtual machine host. The virtual machine 220 includes a virtual processor, virtual memory, and virtual storage. The virtual machine 220 may be a software implemented version of a computer. The virtual machine 220 may also include a variety of other virtual devices that correspond to physical devices. For example, the virtual machine 220 may include devices such as a virtual sound card, a virtual network interface, and virtual USB devices. The virtual machine 220 may also have an associated configuration that specifies the hardware and software parameters of the virtual machine 220. The virtual machine configuration may specify the number and type of processors, the amount of memory, the amount of storage, and the operating system that the virtual machine 220 may include. The configuration may further specify how the virtual resources map to physical resources. For example, the virtual machine 220 may have corresponding physical resources in the virtual machine host.

The virtual machine host may be responsible for executing and managing the virtual machine 220. This may be done through software referred to as a hypervisor. The hypervisor may be responsible for managing and executing the virtual machines 220 and providing the mapping between virtual resources and physical resources. A hypervisor may be installed on the virtual machine host. However, in some cases, virtual machine computer architecture may be more decentralized. For example, the virtual machine host may instead be responsible for only managing and providing access to the virtual machine 220, while other hosts are responsible for executing and providing resources to the virtual machine 220. The virtual machine host may also include physical resources that the virtual machine 220 may need to operate. However, those resources may also be spread across multiple hosts. The virtual machine host may also contain more than one virtual machine 220 such that multiple virtual machines 220 are running simultaneously on the virtual machine host.

The virtual processor may be configured to act as a central processing unit (CPU) for the virtual machine 220. Accordingly, any processes that run within the virtual machine 220 may only be aware of virtual processor. However, the virtual processor may have a corresponding physical processor. Thus, any time the virtual processor is asked to do a unit of work, the virtual processor may relay that unit of work to the physical processor, such that the physical processor does the processing. This may occur via software mechanisms that are able to relay instructions from the virtual processor to the physical processor, or directly through hardware mechanisms that the physical processor may have. For example, some types of processors natively support virtualization. In such cases, the virtual machine 220 may be able to pass instructions directly to the physical processor.

Any time a process in the virtual machine 220 needs the use of memory to store temporary data, the process may store the temporary data in virtual memory. However, the virtual memory may correspond to a reserved space in physical memory. This space may be contiguous or noncontiguous. Thus, any time a process in the virtual machine 220 needs to use the virtual memory, that data may be stored in the corresponding reserved part or parts of physical memory. Physical memory may be random access memory, or any other type of persistent or volatile storage device. The virtual machine 220 also includes virtual storage. The virtual storage may be used for any of the permanent storage that the virtual machine 220 may need. The virtual storage may correspond to one or more image files on physical storage. These files may represent an image of a hard drive. However, in some cases, parts or all of the virtual storage may first be cached in physical memory before being written to one or more files on physical storage. Thus, when the virtual machine 220 is initialized, the one or more files may be read from the physical storage and loaded such that the virtual machine 220 recognizes the one or more files as a persistent storage device. The virtual machine 220 may also implement other functions that a physical computing device would implement, such as sleep or suspend mode.

There are many types of architectures for the virtual machines 220, including virtual machine architecture. A person having skill in the art would recognize that there are a number of other different architectures for the virtual machines 220, and the methods and systems disclosed herein may be adapted to work on any of these architectures.

Figure 3:
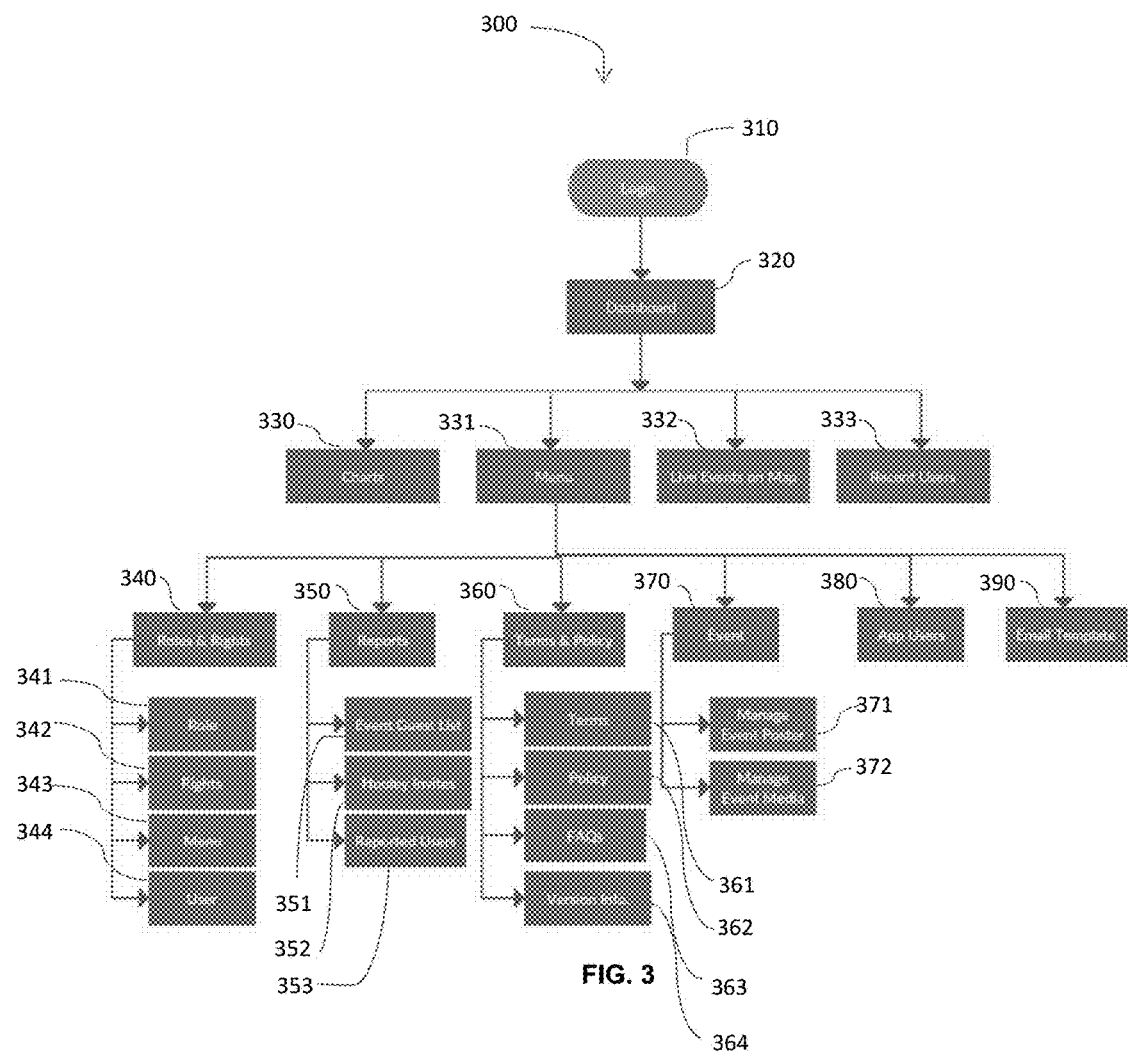
FIG. 3 illustrates a flow diagram of a method for an administrator.

FIG. 3 depicts an embodiment of a flow diagram of a method 300 for an administrator of the Hooley System 100 according to the present invention. The method 300 begins by the administrator logging into the Hooley System 100 at block 310. In block 320, the administrator may utilize a dashboard that displays Hooley-related data, e.g., charts 330 of weekly created Hooley events 370, Hooley event menus 331, a map 332 of locations of Hooley events 370, and a chart of new and/or registered users 333 added to the Hooley System 100. The following descriptions of the figures include graphical representations of embodiments of the Hooley System 100 of the blocks in FIG. 3.

Figure 4:
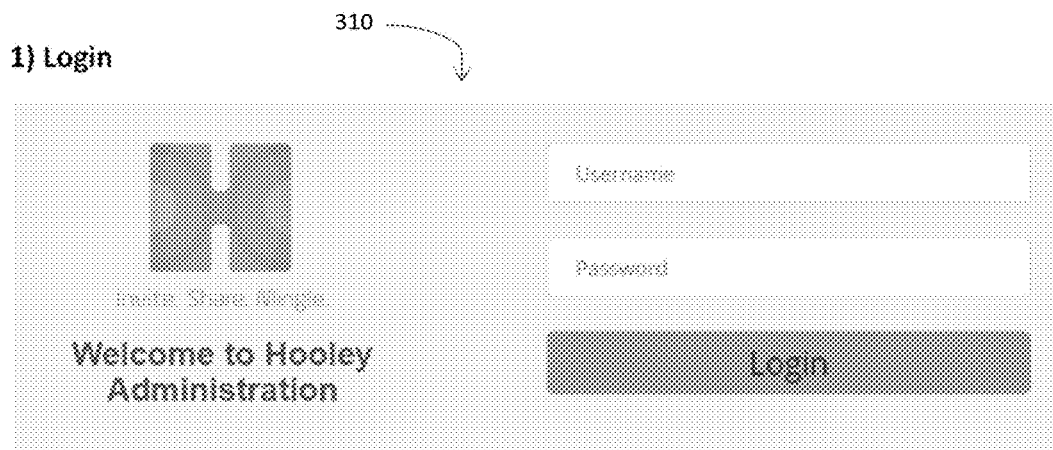
FIG. 4 illustrates a graphical representation of an embodiment of an administrator log-in screen of the Hooley System.

In FIG. 4, an embodiment of the administrator logging into the Hooley System 100 at the block 310 is shown. The login 310 of the Hooley System 100 may include a description of the Hooley System 100, a username interface, and a password interface.

Figure 5:
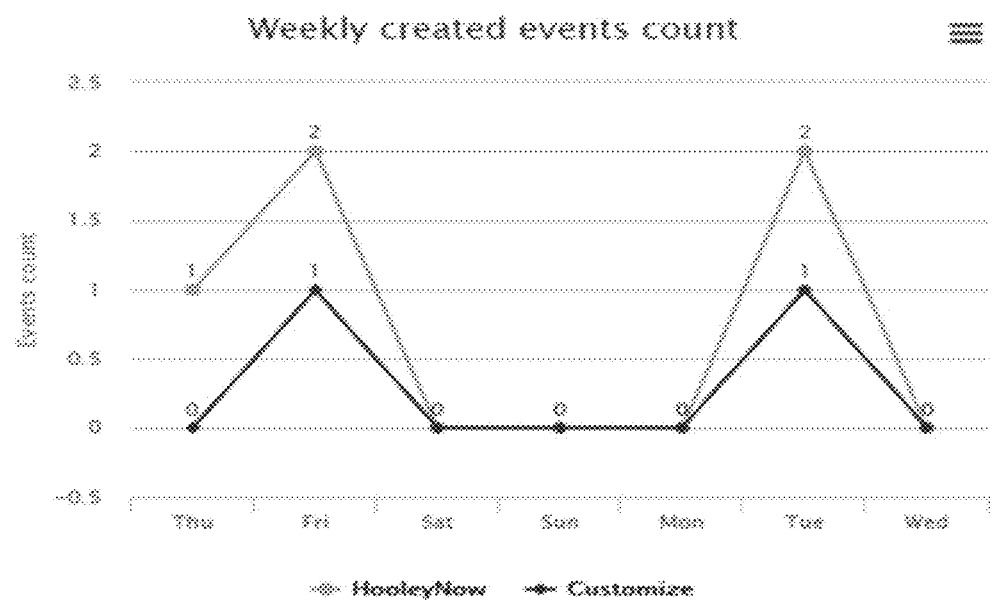
FIG. 5 illustrates an embodiment view of a chart of weekly created events.

In FIG. 5, an embodiment of the chart 330 of the weekly created Hooley events 370 of the Hooley System 100 is shown. The chart 330 of the weekly created Hooley events 370 may include information relating to "Hooley Now" events and customized Hooley events. FIG. 5 further illustrates a comparison between the number of the "Hooley Now" events and the customized Hooley events. The "Hooley Now" events are further described below and illustrated in FIG. 28.

Figure 6:
FIG. 6 illustrates an embodiment view of a map of locations of events.

In FIG. 6, a map 332 of the locations of the Hooley events 370 of the Hooley System 100 is shown. The Hooley events 370 may be illustrated in FIG. 6 as markers to readily determine the location of the Hooley events 370. Google Maps or the Google Earth virtual globe application may be utilized to "map" the Hooley events 370 of the Hooley System 100.

Figure 7:
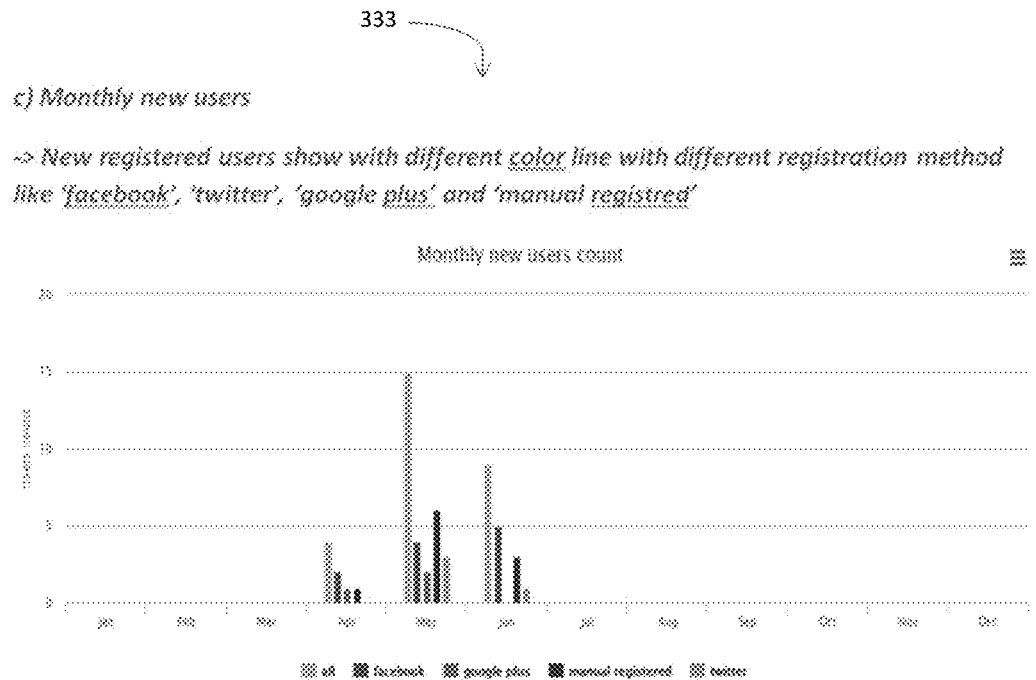
FIG. 7 illustrates an embodiment view of a chart of new users.

In FIG. 7, an embodiment of the chart of the new and/or registered users 333 of the Hooley System 100 is shown. Users may be added to the Hooley System 100 by registering with the system. Different registration methods include Facebook, Twitter, Google+, and manually registering with the Hooley System 100.

Figure 8:
FIG. 8 illustrates a graphical representation of an embodiment of newly registered users.

In FIG. 8, an embodiment of the new users that registered with the Hooley System 100 by the different registration methods is shown. New users may be posted on the dashboard 320 and display the new users' profile pictures and names.

Further in FIG. 3, the Hooley event menus 331 may include roles and rights 340, reports 350, terms and policies 360, Hooley events 370, application users 380, and email templates 390. The roles and rights 340 may include different types of information of roles 341, rights 342, and menus 343 of users 344 of the Hooley System 100. The roles 341, rights 342, and menus 343 of the users 344 may be modified by the administrator of the Hooley System 100.

The reports 350 of the Hooley System 100 may include a report of event guests 351, Hooley invites 352, and users and/or reported users 353. The report of the event guests 351 may include a listing of the Hooley events 370, the Hooley events' 370 start time and date and end time and dates, and user statuses. The user statuses may be designated as "invited," "registered," "on the way," "here now," and "gone." In FIG. 9, an embodiment of the report of the event guests 351 is shown.

The Hooley System 100 may be utilized by the administrator, the users, and the guests. The administrator may establish the initial parameters of the Hooley System 100. The users of the Hooley System 100 may create the Hooley events 370, and the guests of the Hooley System 100 may be users of the Hooley System 100 that are invited to the Hooley events 370 by other users of the Hooley System 100.

In FIG. 10, an embodiment of the report of the Hooley invites 352 is shown. The report of the Hooley invites 352 of the Hooley System 100 may include a listing of users that invited other users to the Hooley events 370. The report of the Hooley invites 352 may also include an email address, personal notes, and time and day of the invite of the users that invited other users to the Hooley events 370.

Figure 11:
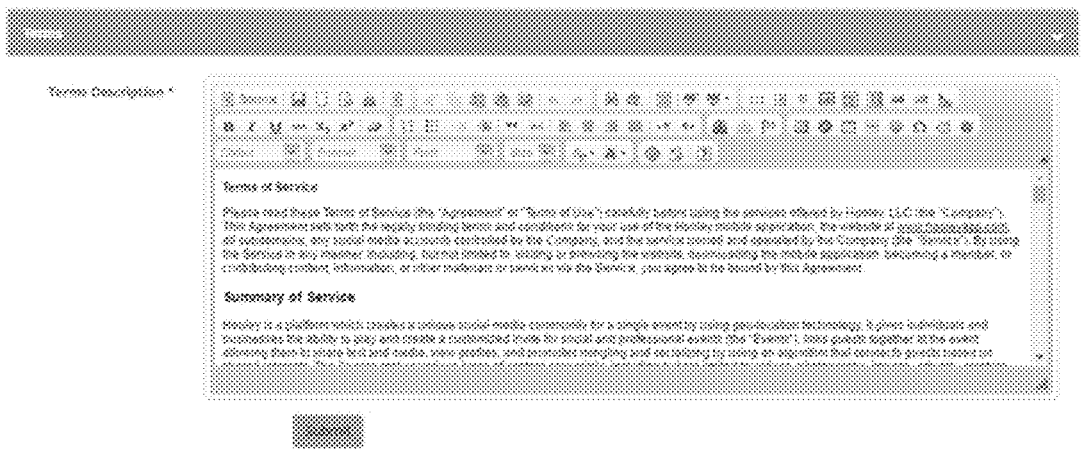
FIG. 11 illustrates a graphical representation of an embodiment of a terms editor.

The terms and policies 360 of the Hooley System 100 may include terms 361, policies 362, frequently asked questions 363, and Hooley version information 364. In FIG. 11, an embodiment of the terms 361 of the Hooley System 100 is shown. The administrator may modify the terms 361 of the Hooley System 100 with an editor and update the terms 361 accordingly. The terms 361 may include "terms of service" and/or "terms of use" that are legally binding to a user of the Hooley System 100. The terms 361 may also include a summary of service with respect to the social media community and the use of geo-location technology.

Figure 12:
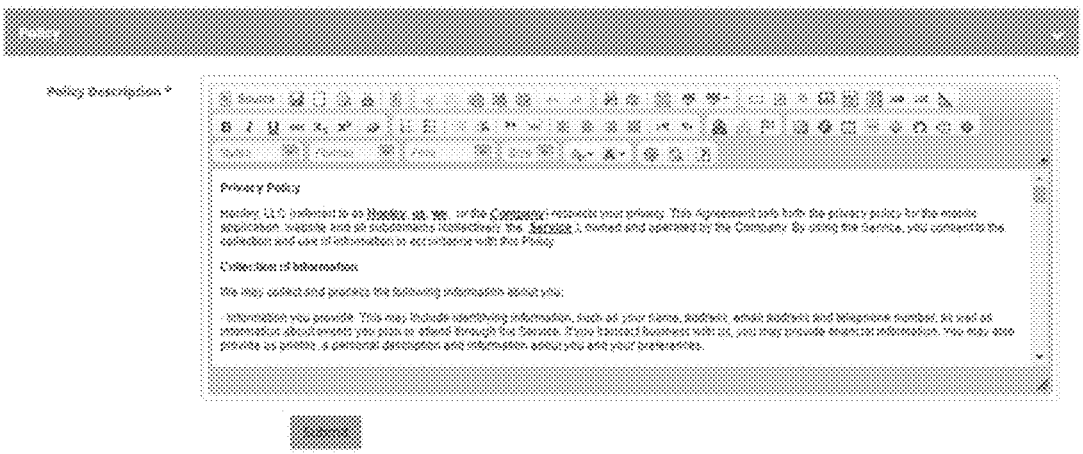
FIG. 12 illustrates a graphical representation of an embodiment of a policy editor.

In FIG. 12, an embodiment of the policies 362 of the Hooley System 100 is shown. The administrator may also modify the policies 362 of the Hooley System 100 with an editor and update the policies 362 accordingly. The policies 362 may include "privacy policies" and "collection of information" of a user that utilizes the Hooley System 100. The "collection of information" policy section may include identifying information of the user, such as the user's name, address, email address, telephone number, information about the Hooley events 370 that the user plans on attending through the Hooley System 100, financial information, photos, personal descriptions, and preferences.

Figure 13:
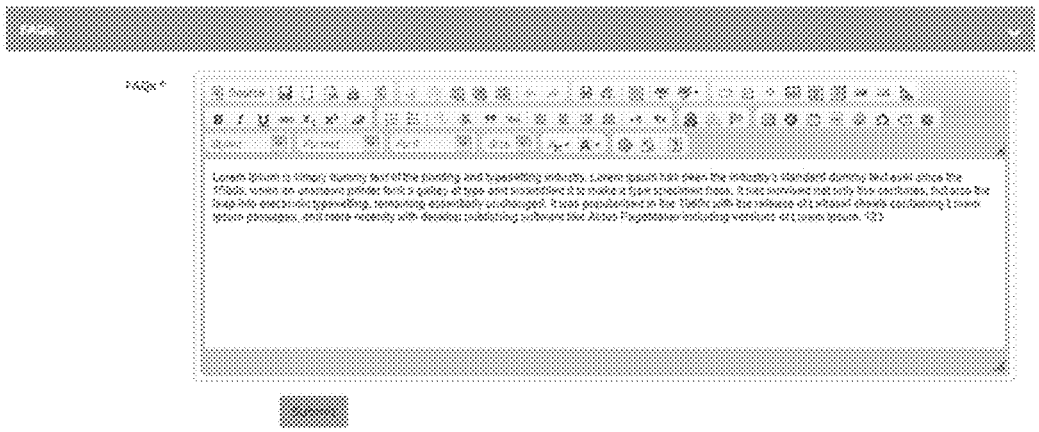
FIG. 13 illustrates a graphical representation of an embodiment of a frequently asked questions editor.

In FIG. 13, an embodiment of the frequently asked questions 363 of the Hooley System 100 is shown. The frequently asked questions 363 section of the Hooley System 100 may be modified by the administrator with an editor. The frequently asked questions 363 may include information regarding how to use the Hooley System 100 and how to create profiles and events. The frequently asked questions 363 section may also include information that may assist the users in using the Hooley System 100.

Figure 14:
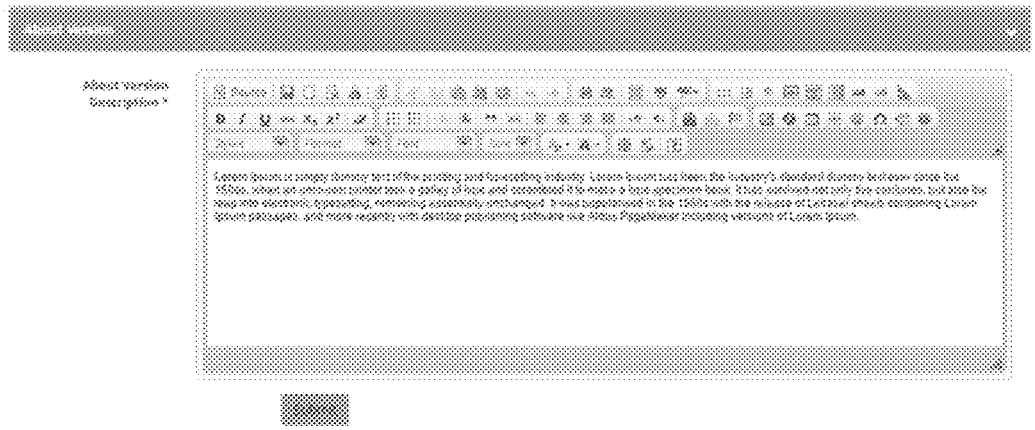
FIG. 14 illustrates a graphical representation of an embodiment of a product version editor.

In FIG. 14, an embodiment of the Hooley version information 364 of the Hooley System 100 is shown. The Hooley version information 364 may also be modified by the administrator with an editor. The Hooley version information 364 may include information about the current version of the Hooley System 100. The Hooley System 100 may be updated periodically to incorporate new features and functions. The Hooley version information 364 may also reflect an updated version number of the Hooley System 100, so that users of the Hooley System 100 may know that they have the most current version of the Hooley System 100.

In FIG. 15, an embodiment of a listing of the Hooley events 370 of the Hooley System 100 is shown. The listing of the Hooley events 370 of the Hooley System 100 may allow the administrator to efficiently review and edit information regarding the Hooley events 370 created by the users in the Hooley System 100. The listing of the Hooley events 370 may include event names, the Hooley events' 370 start time and date and an end time and date, the Hooley events' 370 visibility (e.g., "public" or "private" event), whether the Hooley events 370 are "free" or "paid" events, whether the Hooley events 370 can be bookmarked, a media count (e.g., the number of comments, "likes," and "favorites" of the users; an embodiment is shown in FIG. 17), a link to a map of the location of the Hooley events 370, whether the Hooley events 370 have ended, and the ability to delete the Hooley events 370.

In FIG. 16, an embodiment of a listing of the event posters 371 is shown. The Hooley System 100 may include the listing of event posters 371 and event media 372 that correspond to the Hooley events 370. The listing of the event posters 371 may include event names, the names of the users that posted the Hooley events 370 on the Hooley System 100, pictures designated by the users for the Hooley events 370, and the ability to edit the pictures of the Hooley events 370.

Figure 17:
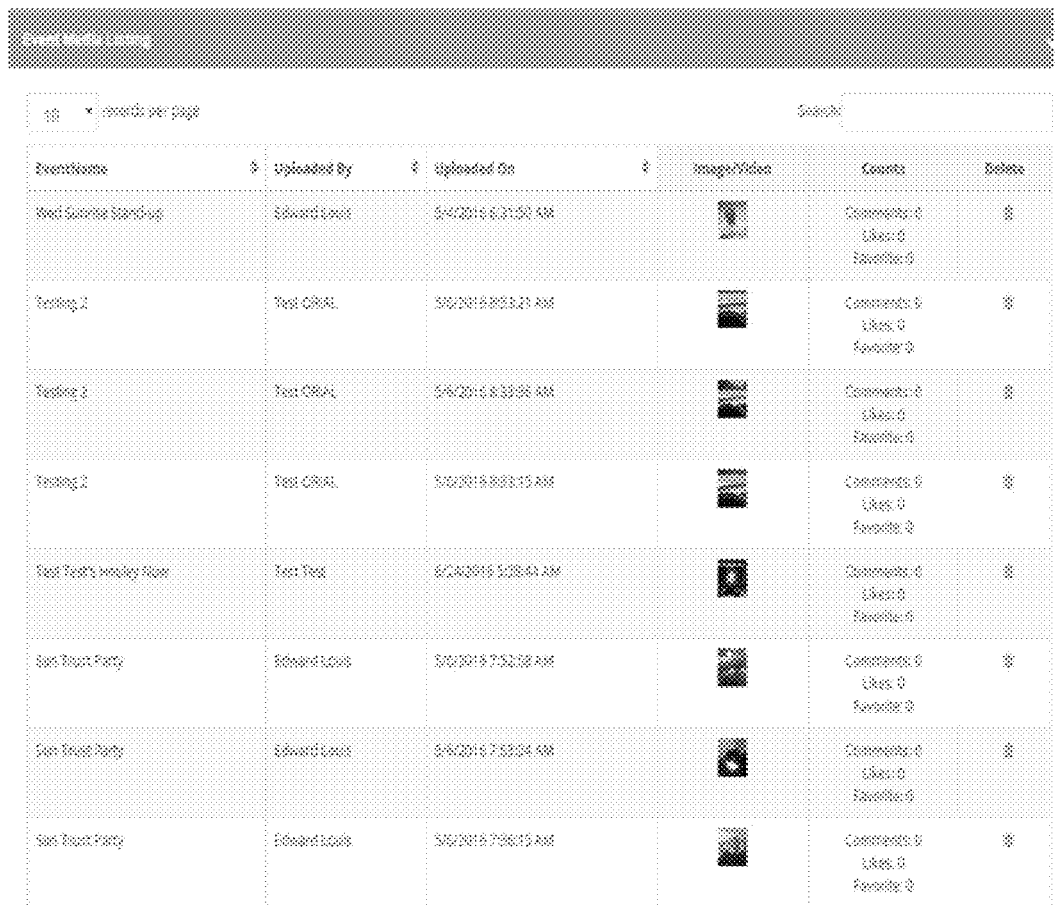
FIG. 17 illustrates a graphical representation of an embodiment of a listing of content media of an event.

In FIG. 17, an embodiment of the listing of the event media 372 of the Hooley System 100 is shown. The listing of the event media 372 may include a compilation of images and videos uploaded by the users of the Hooley System 100. The listing of the event media 372 may include event names, the names of the users that uploaded the images and/or videos onto the Hooley System 100, the images and videos uploaded by the users, number of counts including, but not limited to, comments, "likes," and "favorites" of the users, and the ability to delete any of the images and videos uploaded by the users in the Hooley System 100.

Figure 18:
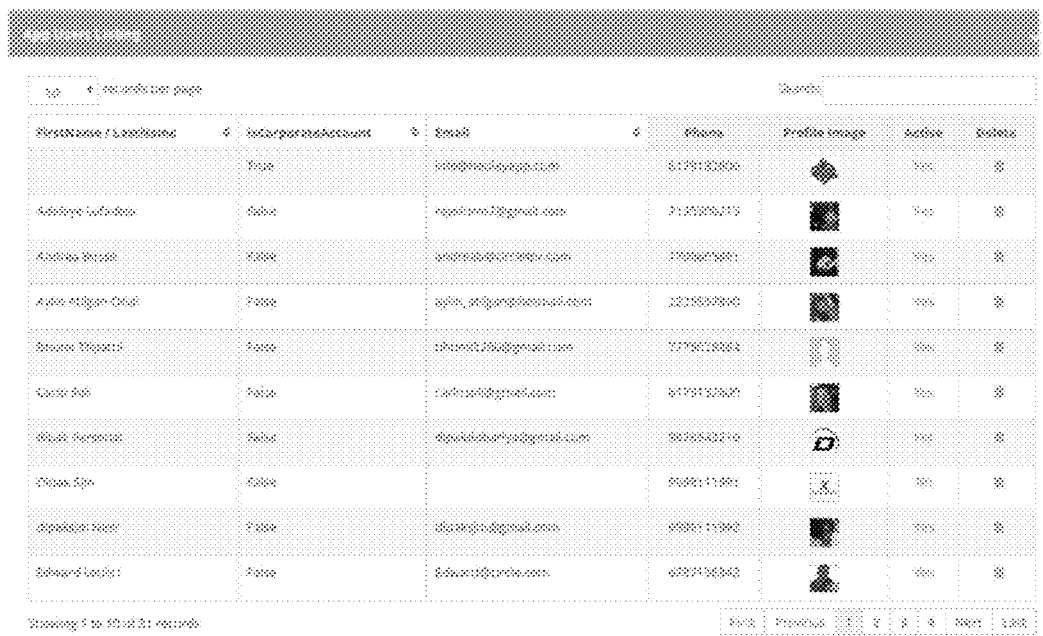
FIG. 18 illustrates a graphical representation of an embodiment of a listing of users.

In FIG. 18, an embodiment of a listing of the application users 380 of the Hooley System 100 is shown. The application users 380 may be users of the Hooley System 100. The listing of the application users 380 may include a full name of the application users 380, whether an account of the application users 380 is a corporate account, an email address of the application users 380, a telephone/mobile phone number of the application users 380, a profile picture/image of the application users 380, whether the application users 380 are active application users, and an ability to delete the account of the application users 380. The application users 380 may be registered users of the Hooley System 100.

Figure 19:
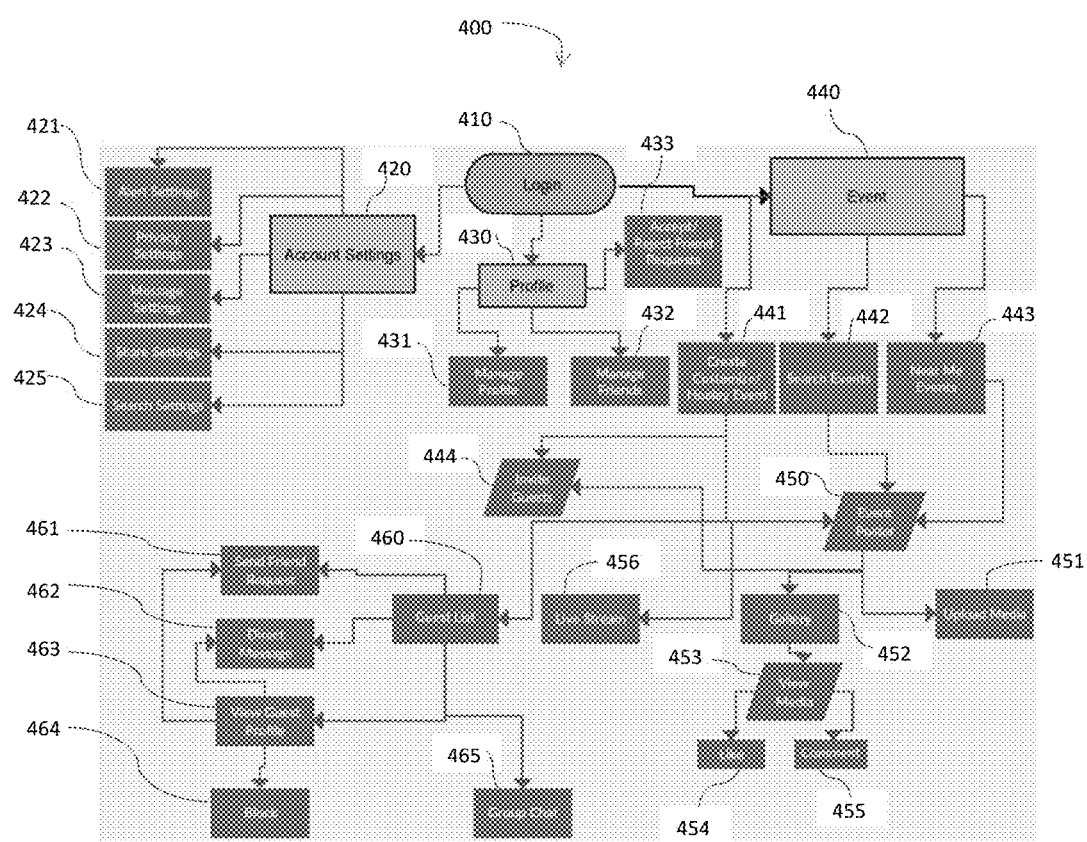
FIG. 19 illustrates an embodiment of a flow diagram of a method for a user.
Figure 20:
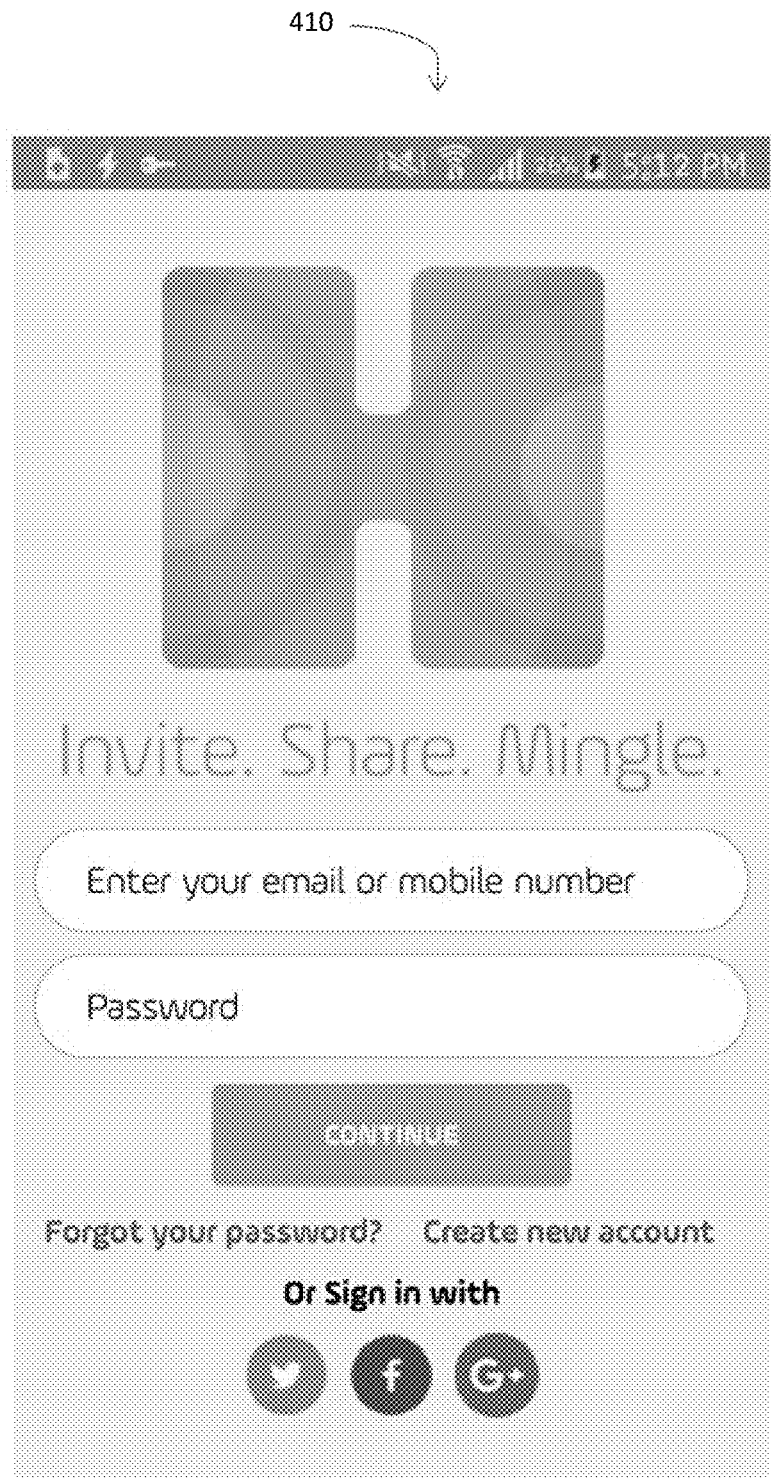
FIG. 20 illustrates a graphical representation of an embodiment of a user log-in screen of the Hooley System.

FIG. 19 depicts an embodiment of a flow diagram of a method 400 for users of the Hooley System 100 according to the present invention. The method 400 begins by the users logging into the Hooley System 100 at block 410, as shown in FIG. 20. In block 420, the users may access their account settings; in block 430, the users may access their profiles; and in block 440, the users may access Hooley events that have been created and completed by the users.

Figure 21:
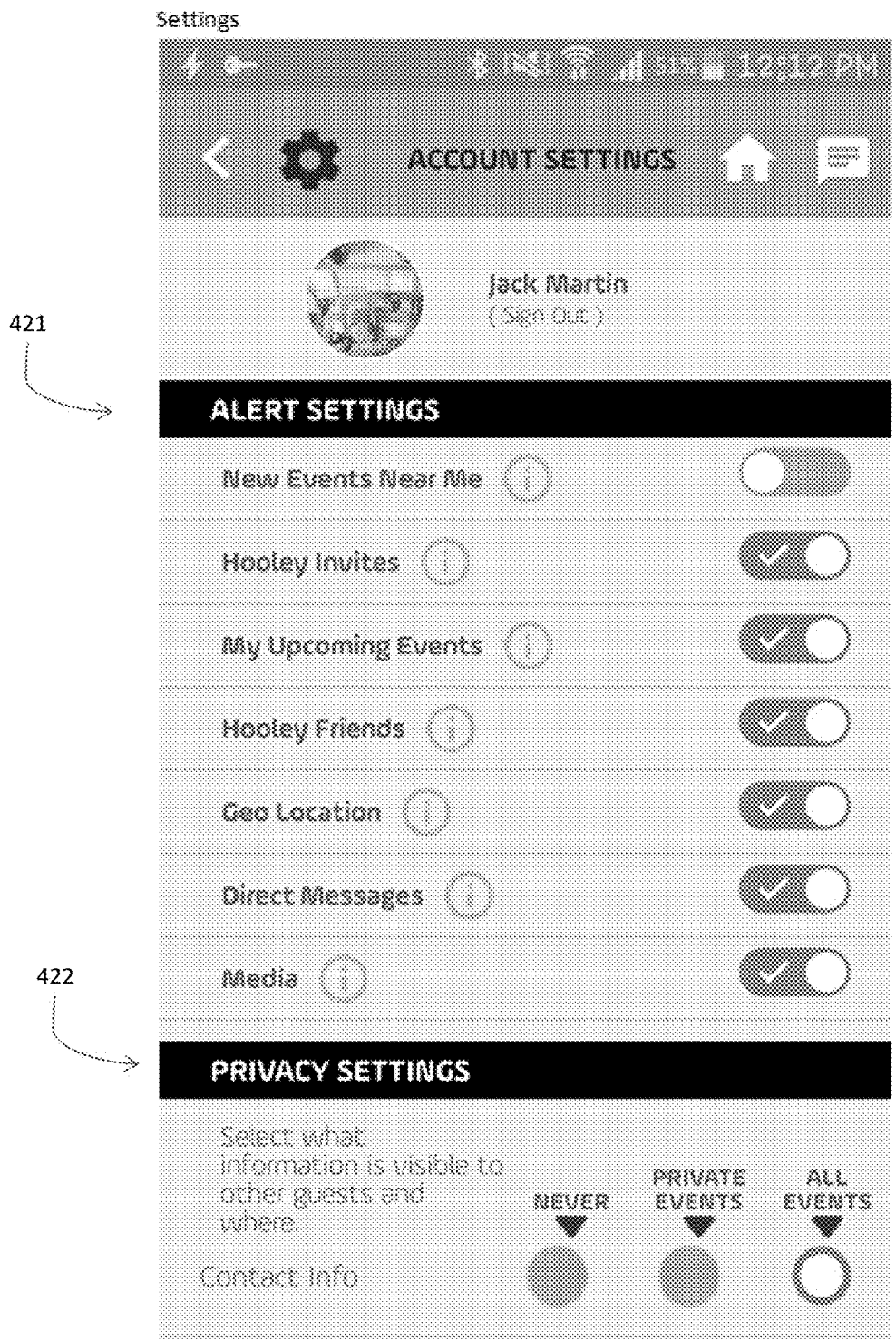
FIG. 21 illustrates a graphical representation of an embodiment of account settings including alert settings and privacy settings.

The account settings 420 of the users of the Hooley System 100 may include alert settings 421, privacy settings 422, message settings 423, share settings 424, and search settings 425. The alert settings 421 may include new Hooley events 440 near the users, Hooley invites, the users' upcoming Hooley events 440, friends of the users, geo-locations, direct messages, and media. The alert settings 421 allow the users to turn on or off each sub-setting. For example, the users can turn on or off the ability of the geo-location device to determine the geo-location of the users. In FIG. 21, embodiment of the alert settings 421 of the Hooley System 100 is shown.

In FIG. 21, an embodiment of the privacy settings 422 of the Hooley System 100 is also shown. The privacy settings 422 allow the users to select what kind of information is visible to other guests of the Hooley System 100. For example, the users may not share their contact information with any guests from the Hooley System 100, or the users may share their contact information with those guests that are attending the same private or public Hooley events 440.

Figure 22:
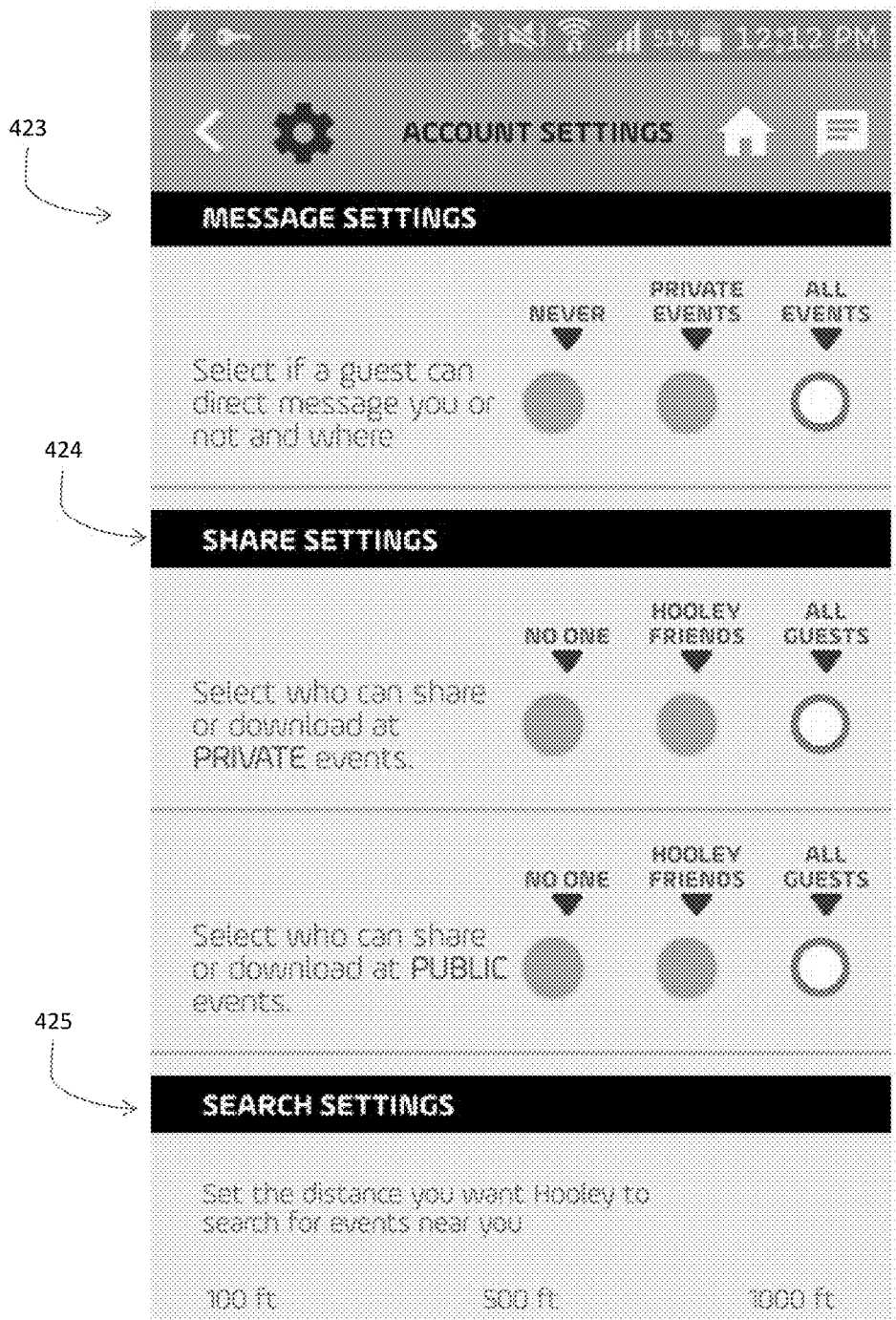
FIG. 22 illustrates a graphical representation of an embodiment of account settings including message settings, share settings, and search settings.

In FIG. 22, an embodiment of the message settings 423, the share settings 424, and the search settings 425 of the Hooley System 100 is shown. The message settings 423 may allow users to select when a guest of the Hooley System 100 can direct message the users. For example, users of the Hooley System 100 may not allow any guest from the Hooley System 100 to direct message the users, allow guests to be able to direct message users only in private Hooley events 440, or allow guests to be able to direct message users in both private and public Hooley events 440.

The share settings 424 of the Hooley System 100 may allow users to select when a guest can share or download media content of the users at private or public Hooley events 440. The share settings 424 may also allow users of the Hooley System 100 to share media content with no other user of the Hooley System 100, with Hooley "friends," or with all guests invited to Hooley events 440.

The search settings 425 of the Hooley System 100 may allow users to select the distance from the users to search for nearby Hooley events 440. For example, users of the Hooley System 100 may search for Hooley events 440, 100 feet, 500 feet, or 1000 feet from the users' location.

Figure 23:
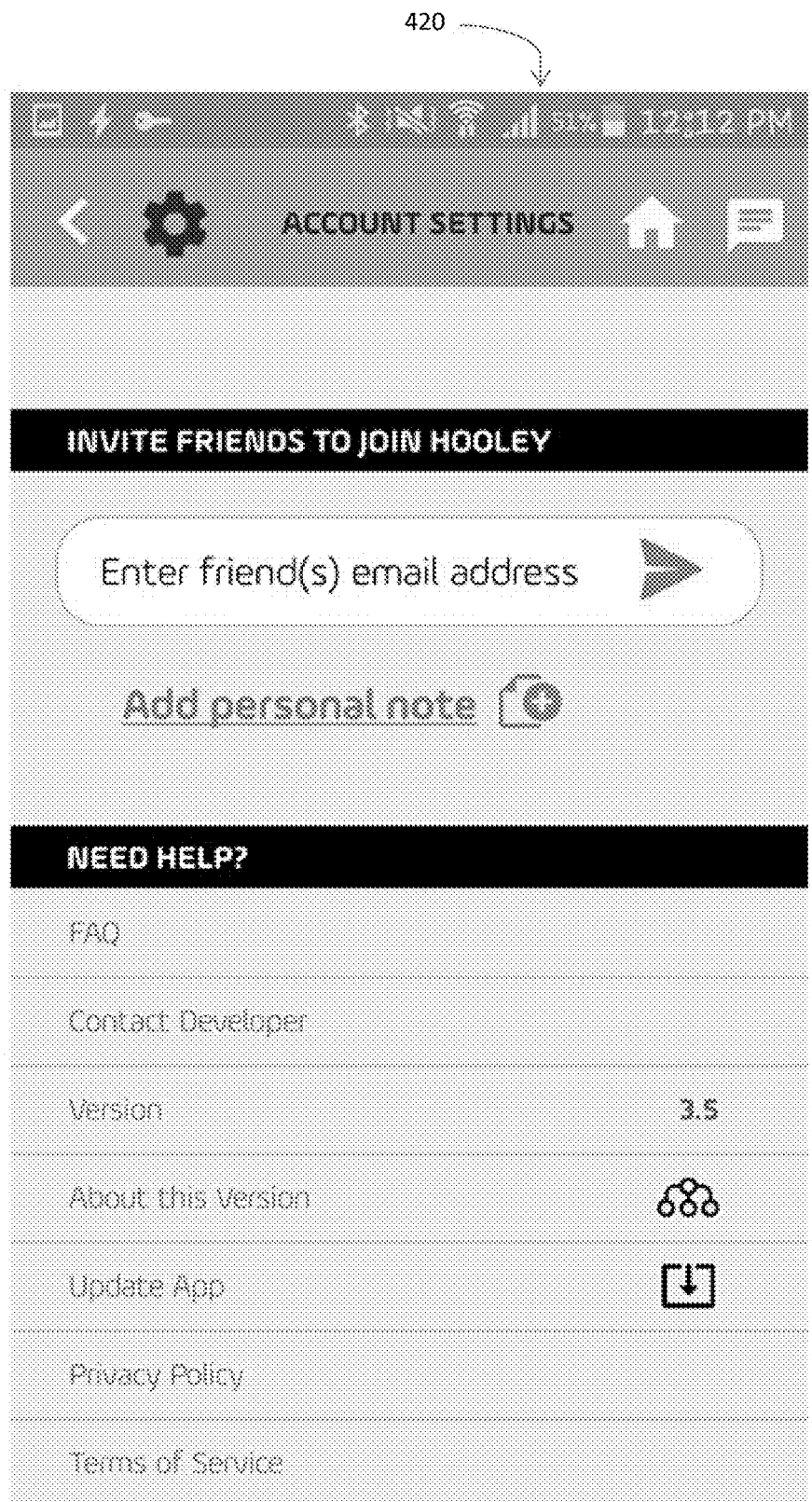
FIG. 23 illustrates a graphical representation of an embodiment of account settings.

In FIG. 23, an embodiment of the account settings 420 of the Hooley System 100 is shown. The account settings 420 may include a function to invite friends to join the Hooley System 100 by entering and sending an invitation to the friends' email address. The account settings 420 may also include features such as frequently asked questions, contact developers, Hooley version numbers, information about the version of the Hooley System 100, an option to update the Hooley System 100, privacy policies, and terms of service.

Figure 24:
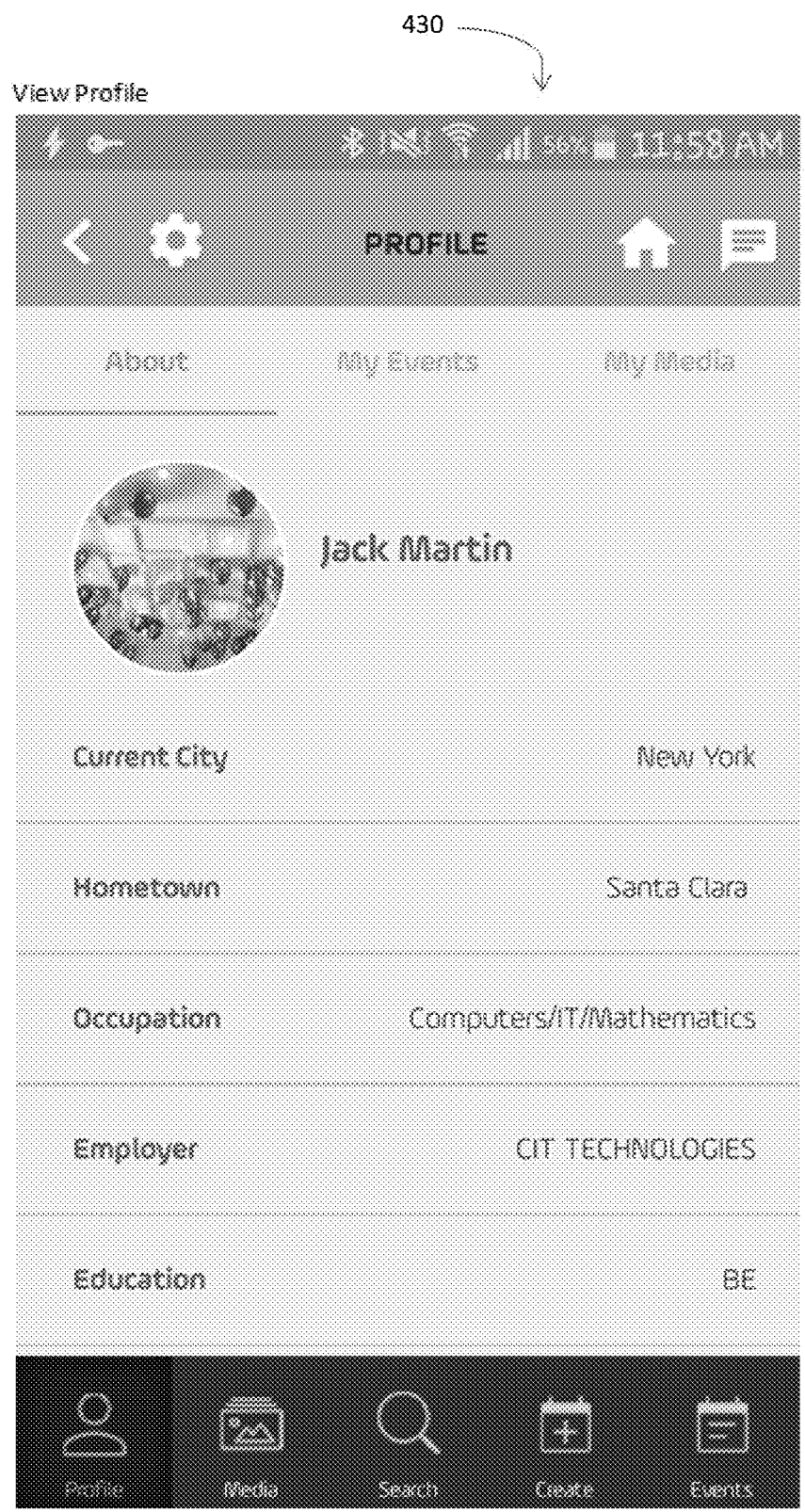
FIG. 24 illustrates a graphical representation of an embodiment of a profile.

In FIG. 24, an embodiment of the profiles 430 of the Hooley System 100 is shown. The profiles 430 of the users of the Hooley System 100 may include the ability to change and manage the user's profiles 431, the ability to change and manage the user's friends 432, and the ability to accept and reject friend requests 433. The profiles 430 of the Hooley System 100 may also include information about the users including, but not limited to, the users' current city, hometown, occupation, employer, and education level.

Figure 25:
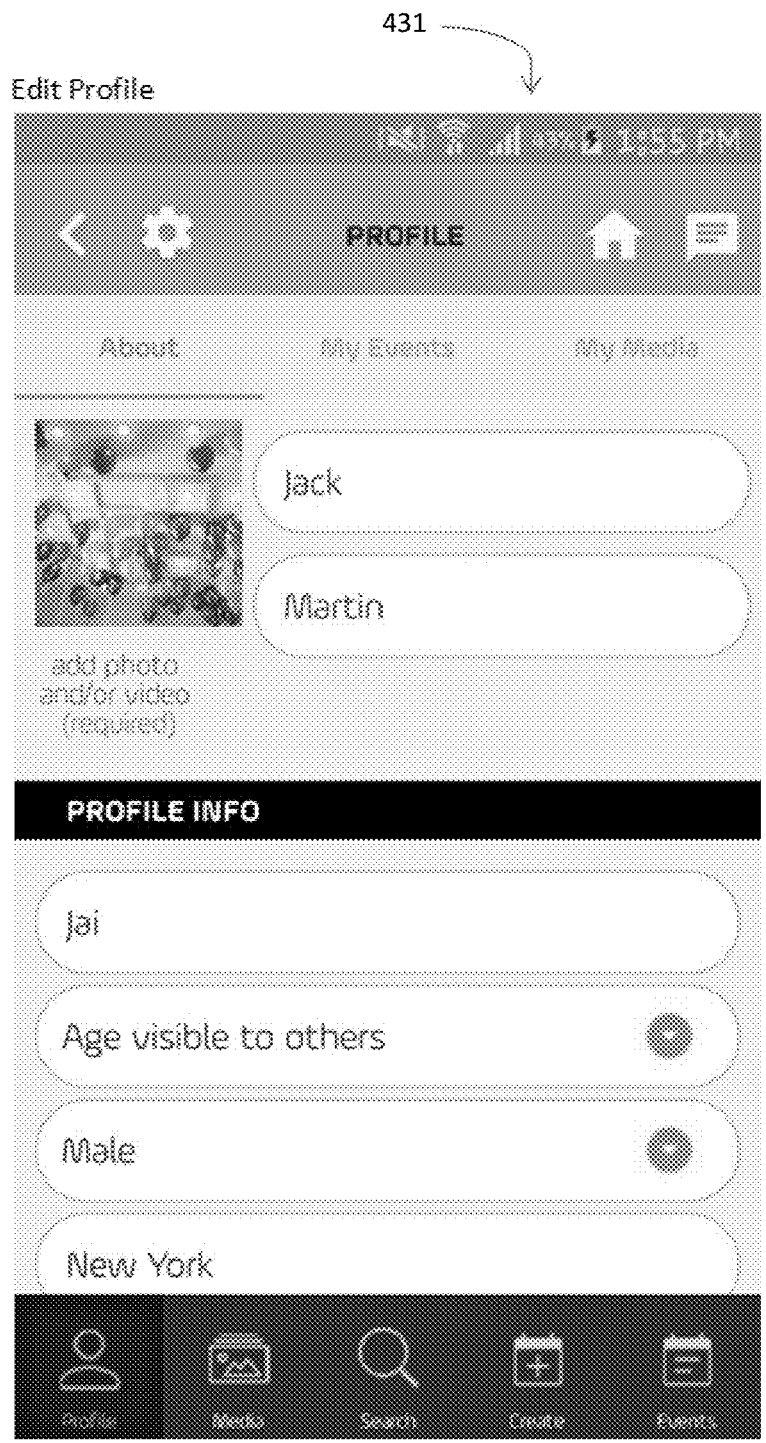
FIG. 25 illustrates a graphical representation of an embodiment of editing a profile.

In FIG. 25, an embodiment of the ability to change and manage the users' profiles 431 of the Hooley System 100 is shown. Information of the users that may be changed and managed includes the users' name, nickname, username, age that is visible to other users of the Hooley System 100, gender, and designated city.

Figure 26:
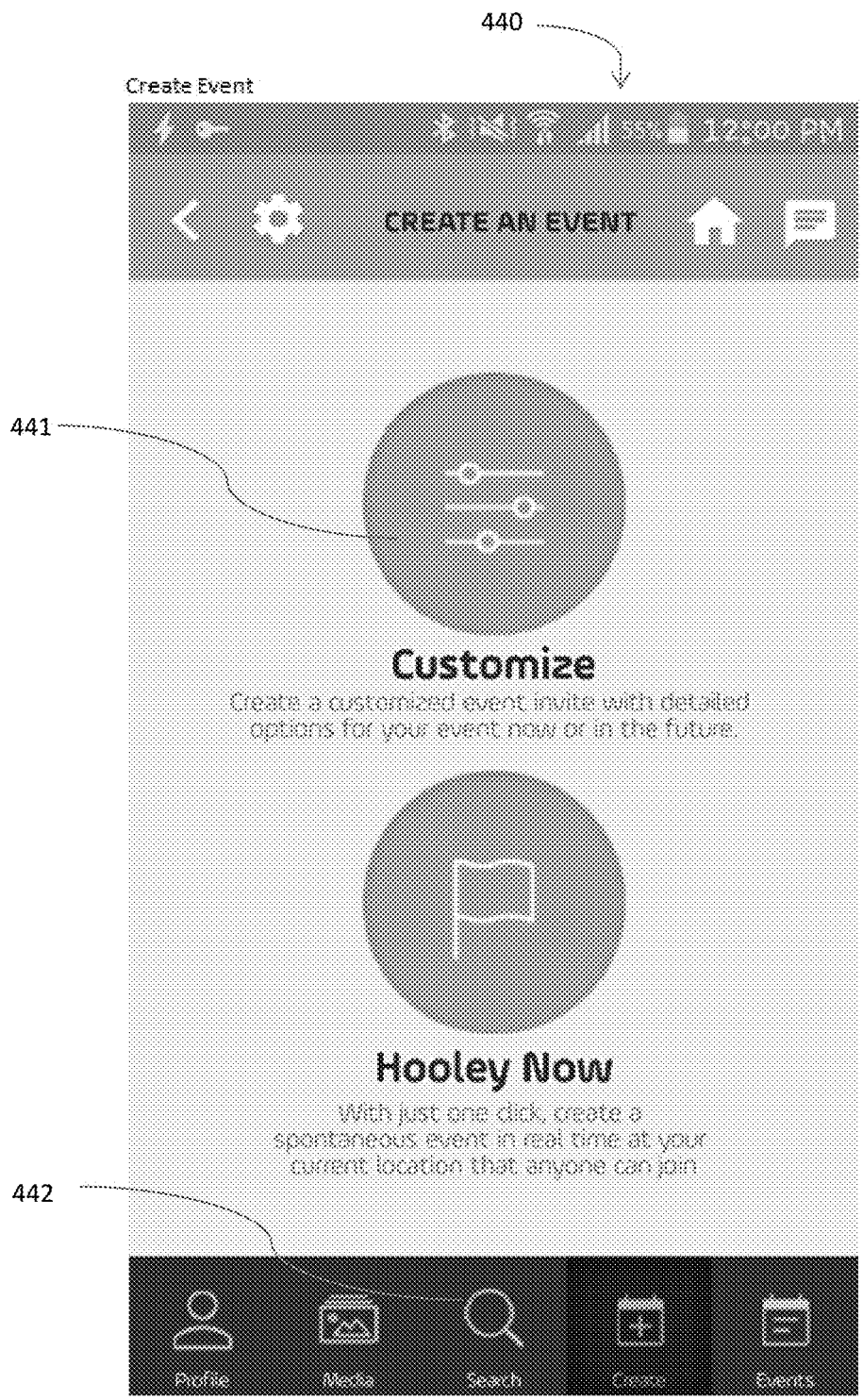
FIG. 26 illustrates a graphical representation of an embodiment of creating events.
Figure 28:
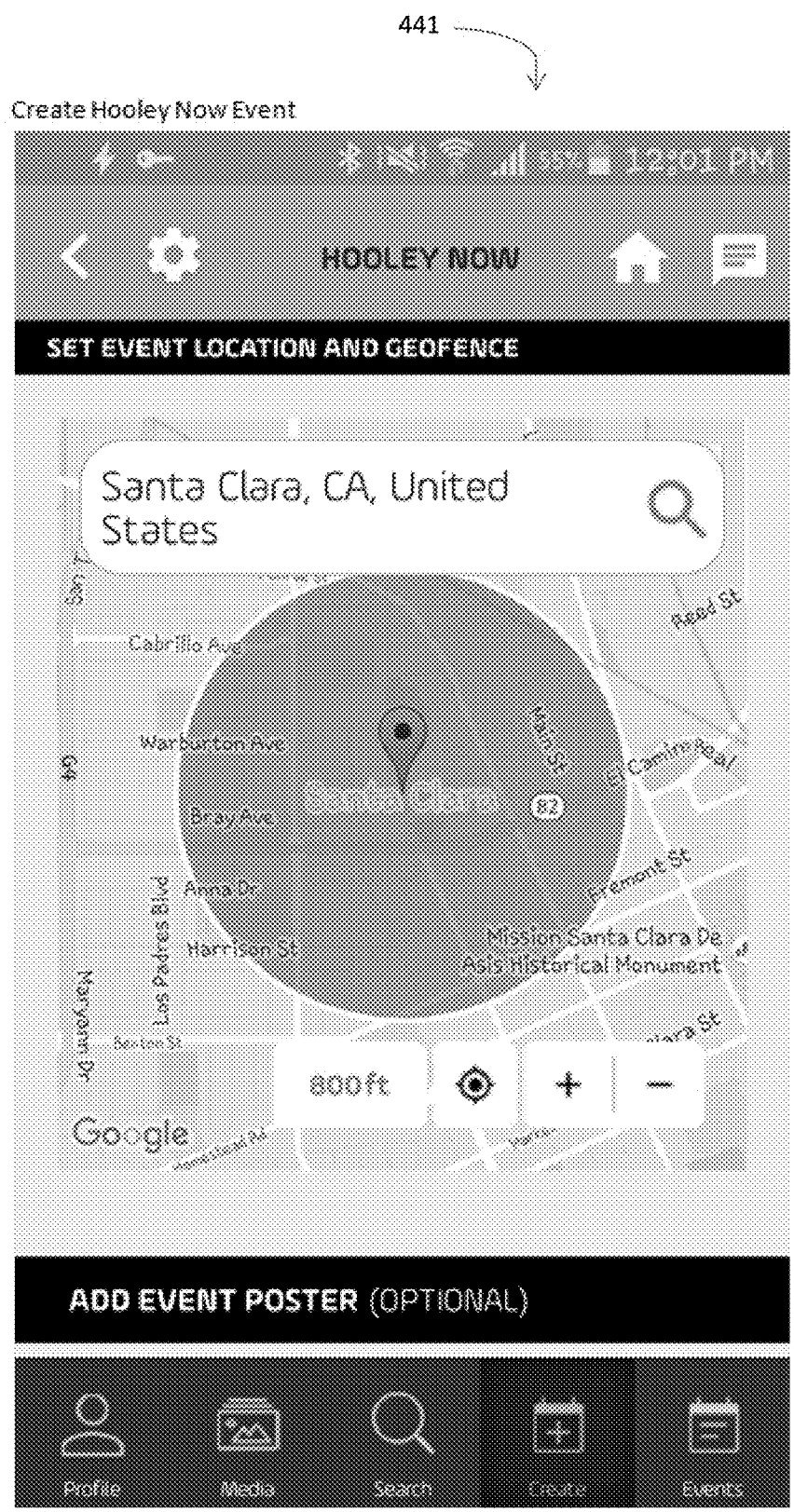
FIG. 28 illustrates yet another graphical representation of an embodiment of creating events.
Figure 33:
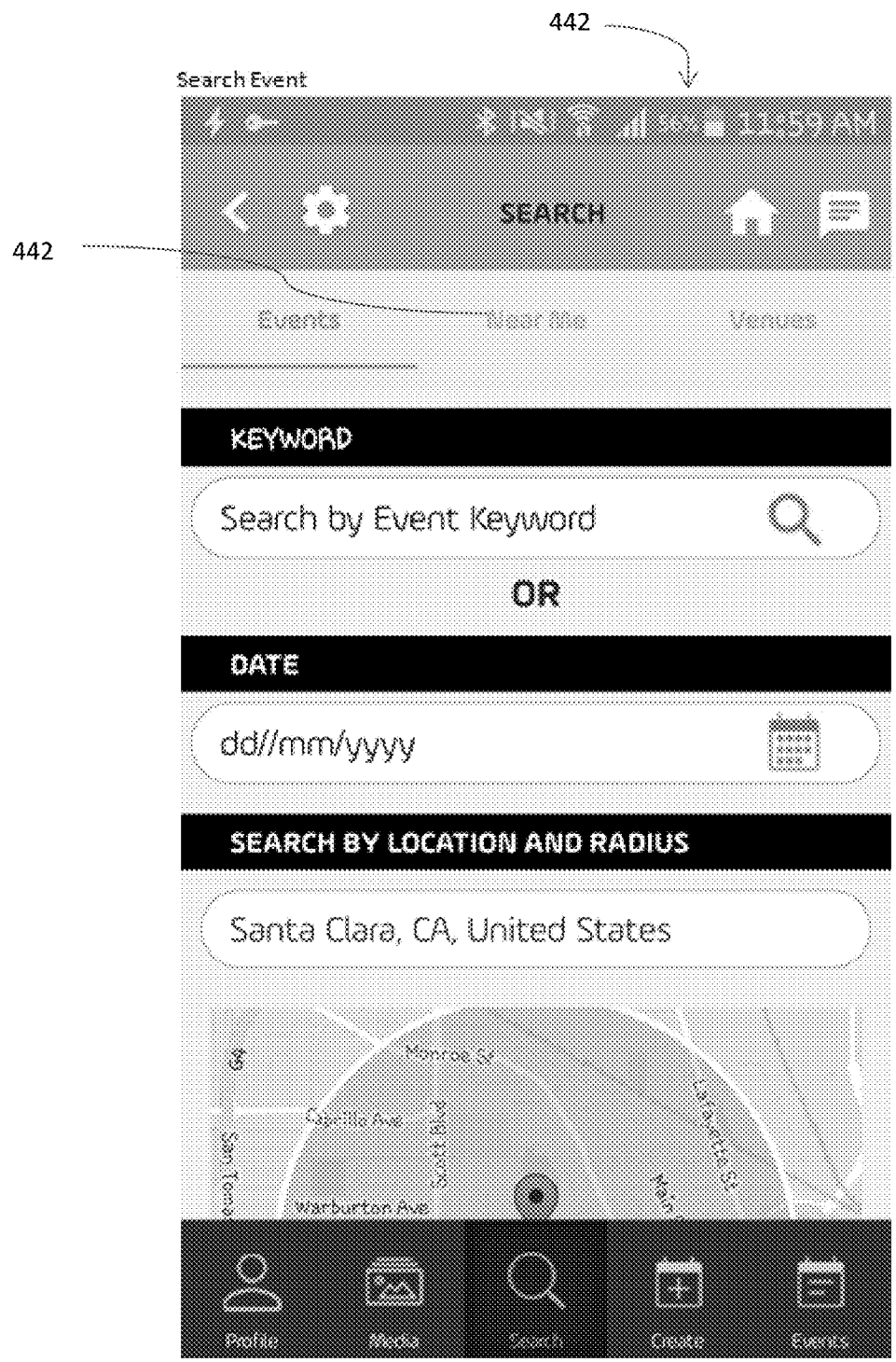
FIG. 33 illustrates a graphical representation of an embodiment of searching for events.

In FIG. 26, an embodiment of the Hooley events 440 of the Hooley System 100 is shown. The Hooley events 440 of the Hooley System 100 may include the ability of the users to create and customize 441 the Hooley events 440, the ability of the users to search 442 for the Hooley events 440, and the ability of the users to explore 443 the Hooley events 440 near the users, as shown in FIG. 33. The users of the Hooley System 100 may also create a new Hooley event 440 (e.g., Hooley Now) at their current location. This new Hooley event 440 may also be created spontaneously, in real-time, and open to anyone utilizing the Hooley System 100. The users may also select the location of the Hooley events 440 and distance of a geo-fence (e.g., distance from the users' and/or events' location) around the location of the Hooley events 440, as shown in FIG. 28.

Figure 27:
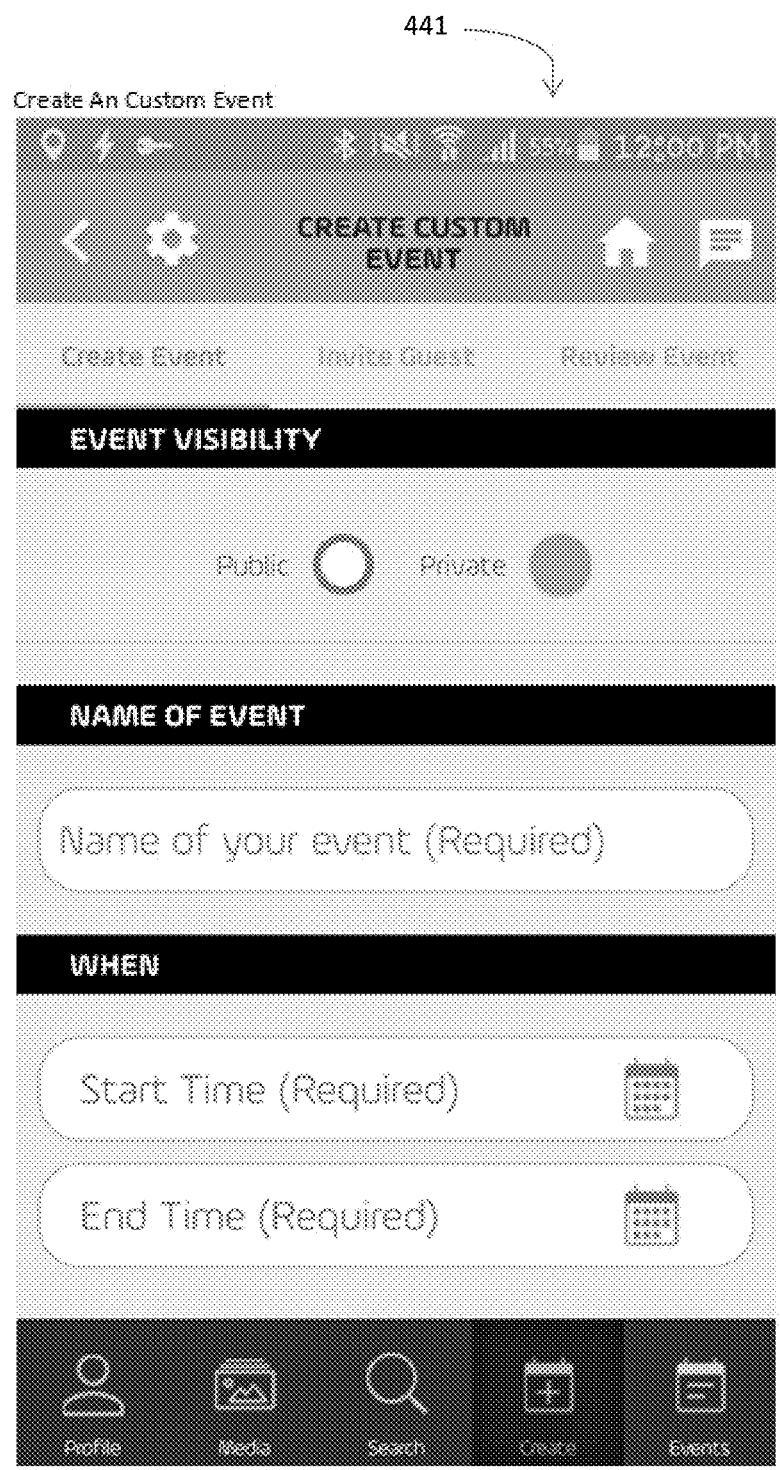
FIG. 27 illustrates another graphical representation of an embodiment of creating events.

In FIG. 27, an embodiment of the ability to create and customize Hooley events 441 is shown. The users of the Hooley System 100 may select whether the Hooley events 440 are public or private. The users of the Hooley System 100 may also include names of the Hooley events 440 and when the Hooley events 440 will start and end (e.g., time and date of the Hooley events 440).

Figure 29:
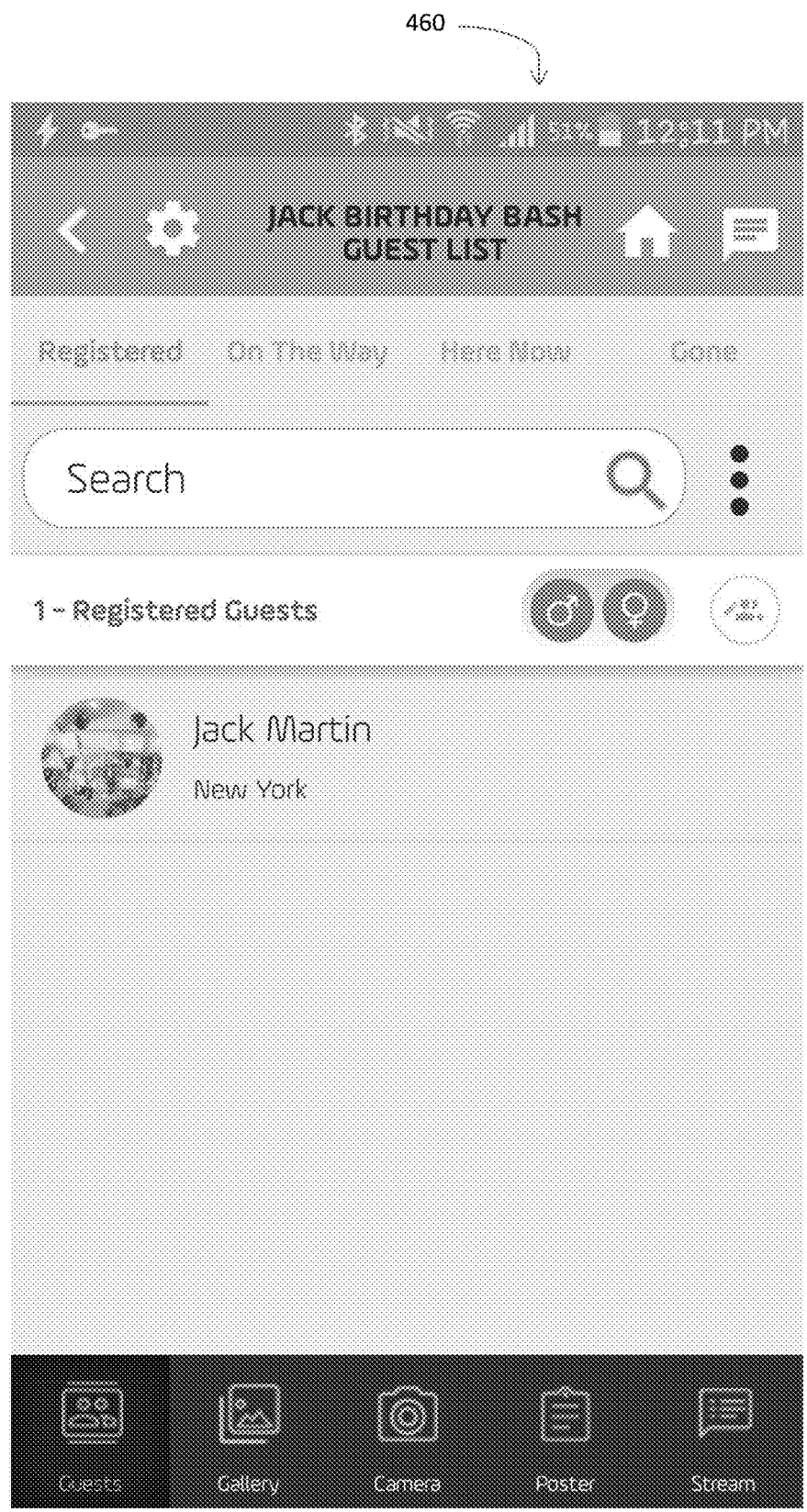
FIG. 29 illustrates a graphical representation of an embodiment of a guest list.

The Hooley events 440 created by the users may include inviting guests 444, guest lists 460, and a galleries 452 of media content 453 (e.g., images, videos, clips, GIFs, etc.). In FIG. 29, an embodiment of the guest lists 460 of the Hooley System 100 is shown. The users of the Hooley System 100 may also be able to search for guests in the guest lists 460. The guest lists 460 may also include the gender of the guests attending the Hooley events 440.

Figure 30:
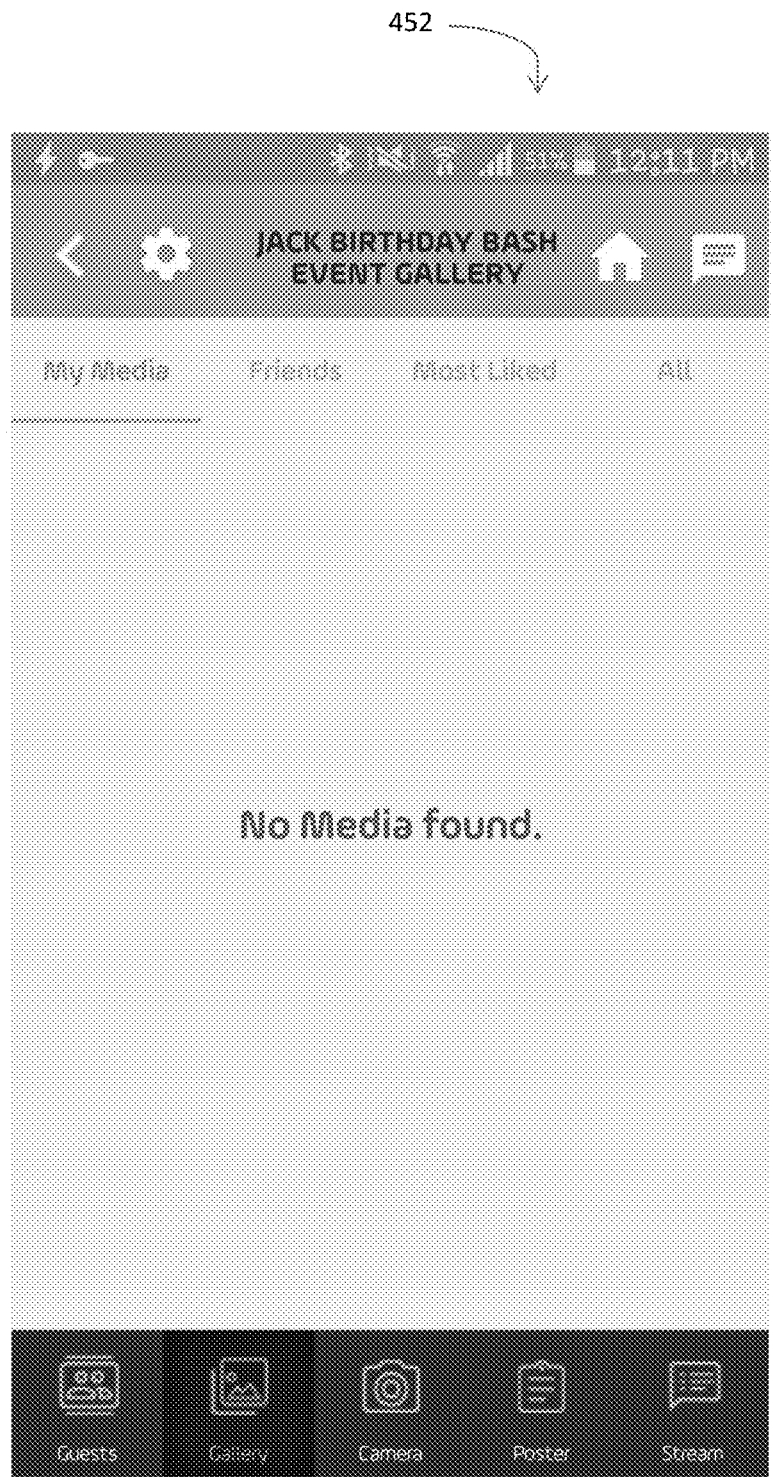
FIG. 30 illustrates a graphical representation of an embodiment of a gallery.

In FIG. 30, an embodiment of the galleries 452 of the Hooley System 100 is shown. Guests of the Hooley events 440 may view the media content 453 (e.g., images, videos, clips, GIFs, etc.) posted by other guests. The galleries 452 may include media content posted by the users and the guests at the Hooley events 440, media content that is the "most liked" by guests at the Hooley events 440, and all media content posted at the Hooley events 440.

Figure 31:
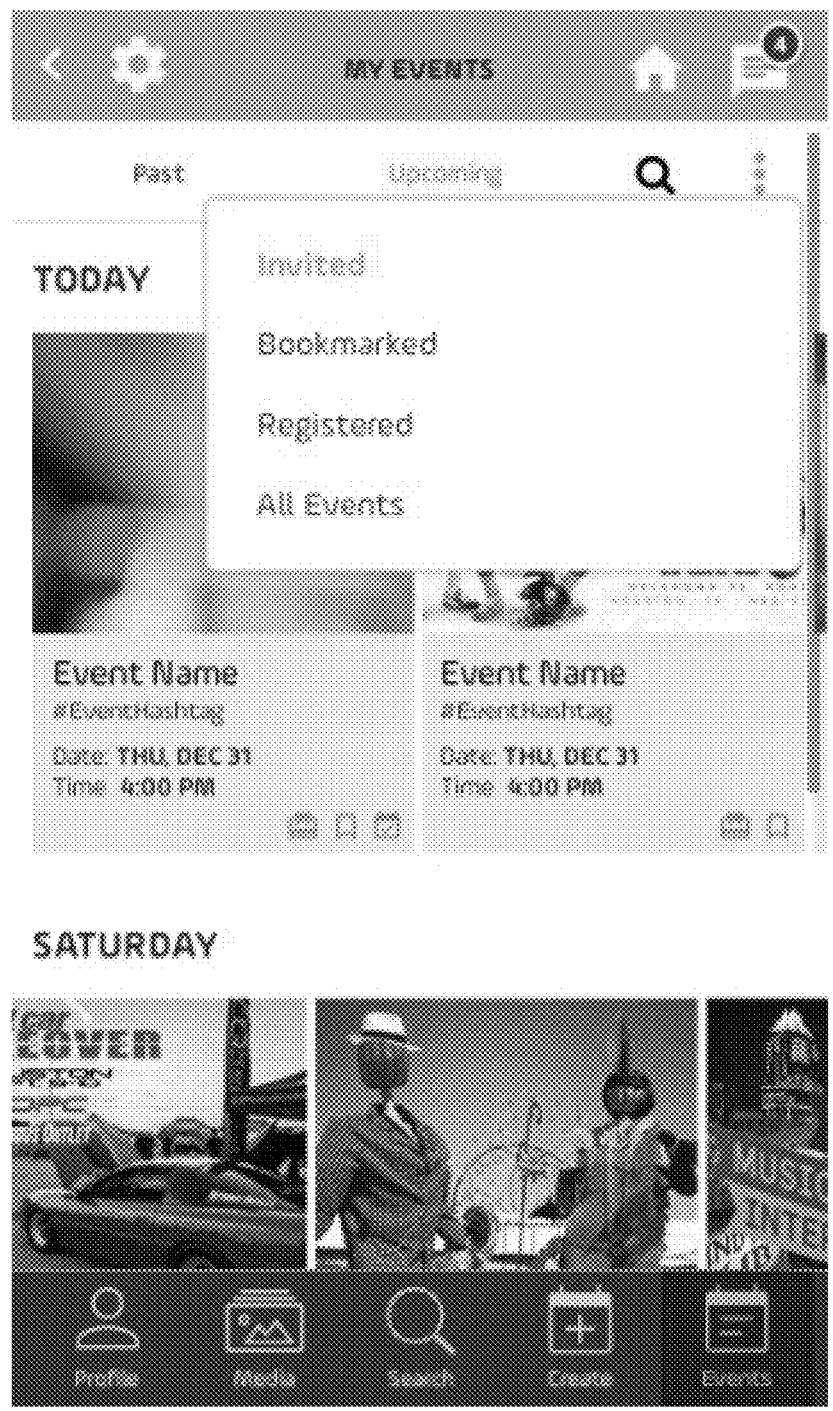
FIG. 31 illustrates a graphical representation of an embodiment of upcoming events.
Figure 32:
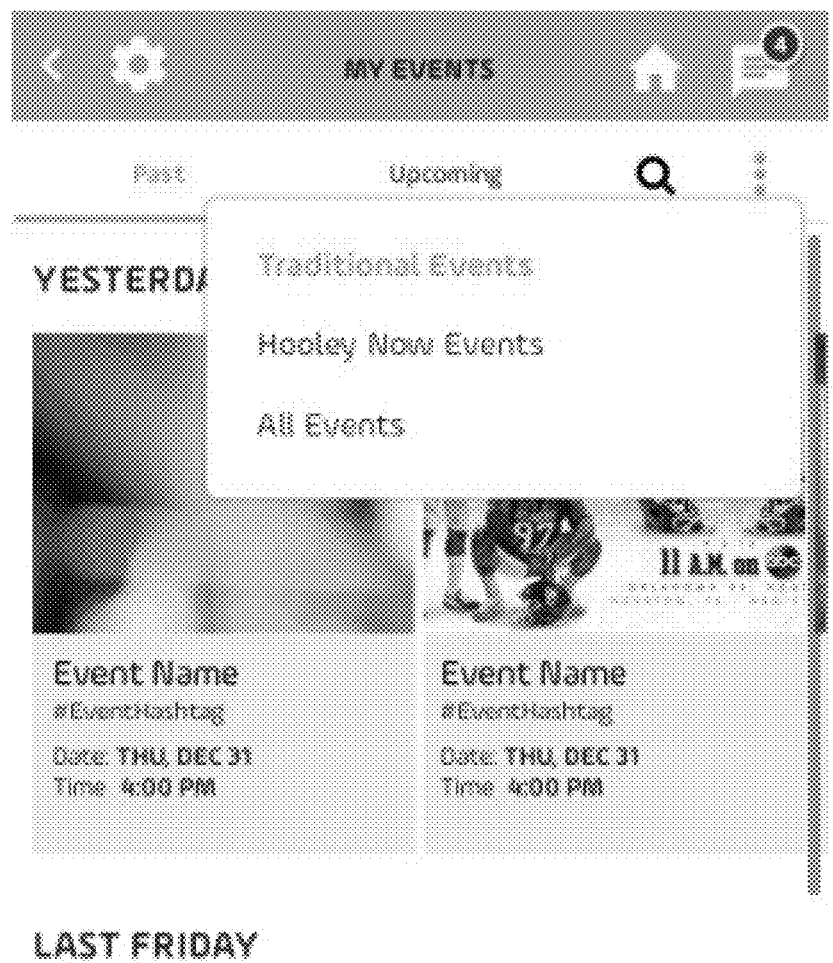
FIG. 32 illustrates a graphical representation of an embodiment of past events.
Figure 32:
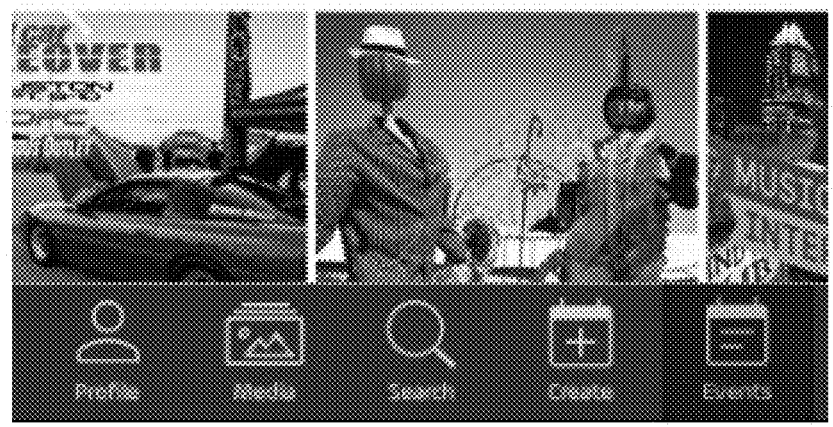

The users of the Hooley System 100 may also include the ability to view past and upcoming Hooley events 440. An example of viewing the past and upcoming Hooley events 440 is shown in FIGS. 31 and 32. The users of the Hooley System 100 may scroll or manipulate their Hooley events 440 to easily access their past and upcoming Hooley events 440. The view of the upcoming Hooley events 440 may include a sub-menu of invited, bookmarked, registered, and all events that the users of the Hooley System 100 have designated. The view of the past Hooley events 440 may also include a sub-menu of traditional events, Hooley Now events, and all events. The traditional events may include any event that may not be a Hooley Now event.

In FIG. 33, an embodiment of the ability of the users of the Hooley System 100 to explore 443 the Hooley events 440 near the users is shown. The users of the Hooley System 100 can search for the Hooley events 440 by event name, by location (e.g., near the users' physical location), and by venue. The users of the Hooley System 100 may also search for the Hooley events 440 by date and keyword searches. For example, if the users of the Hooley System 100 wanted to search for a dog-gathering event, the users could search for "dog party" and the Hooley System 100 would provide the Hooley events 440 that were associated with dogs and parties.

Figure 34:
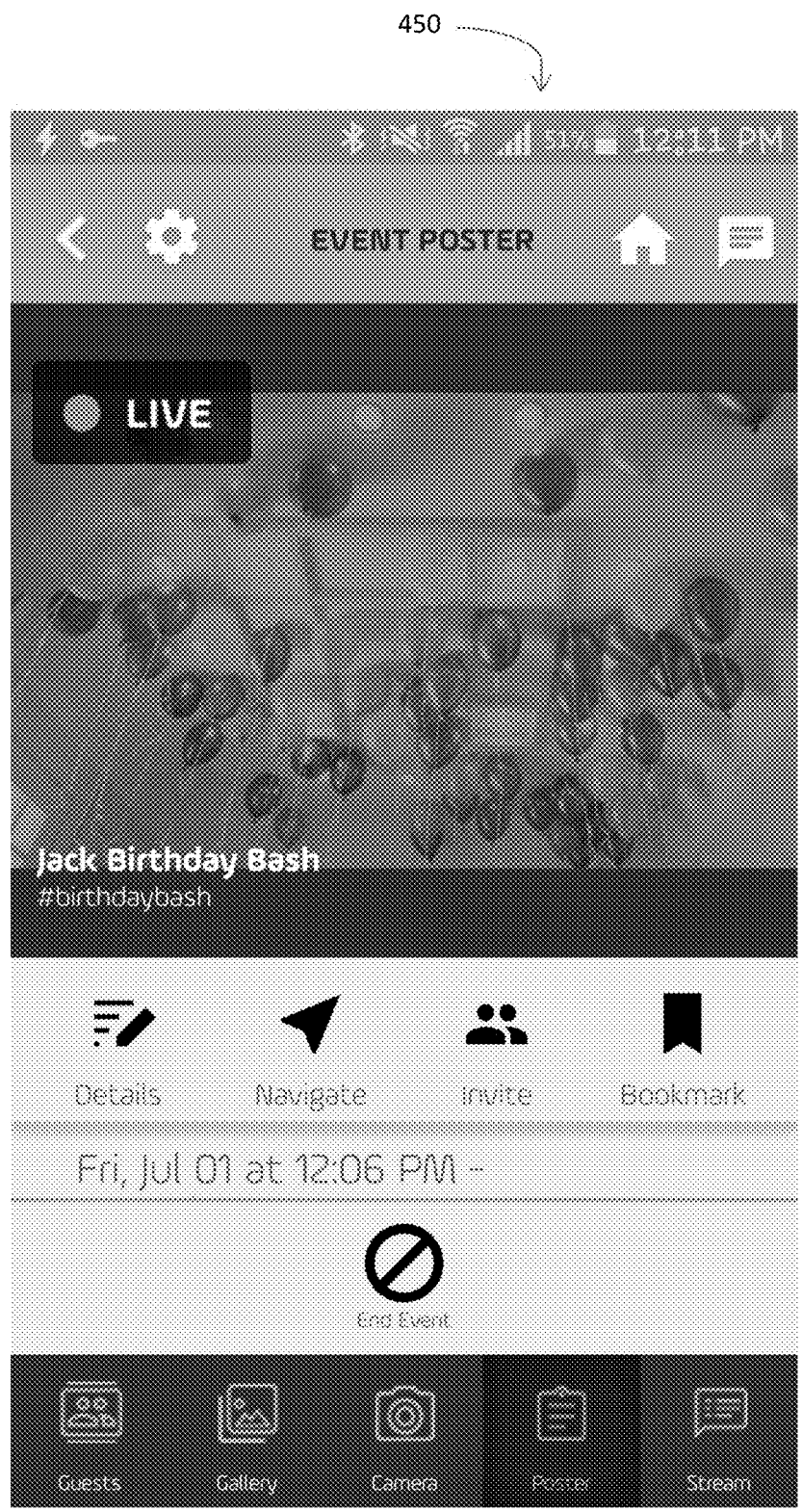
FIG. 34 illustrates a graphical representation of an embodiment of an event poster.
Figure 35:
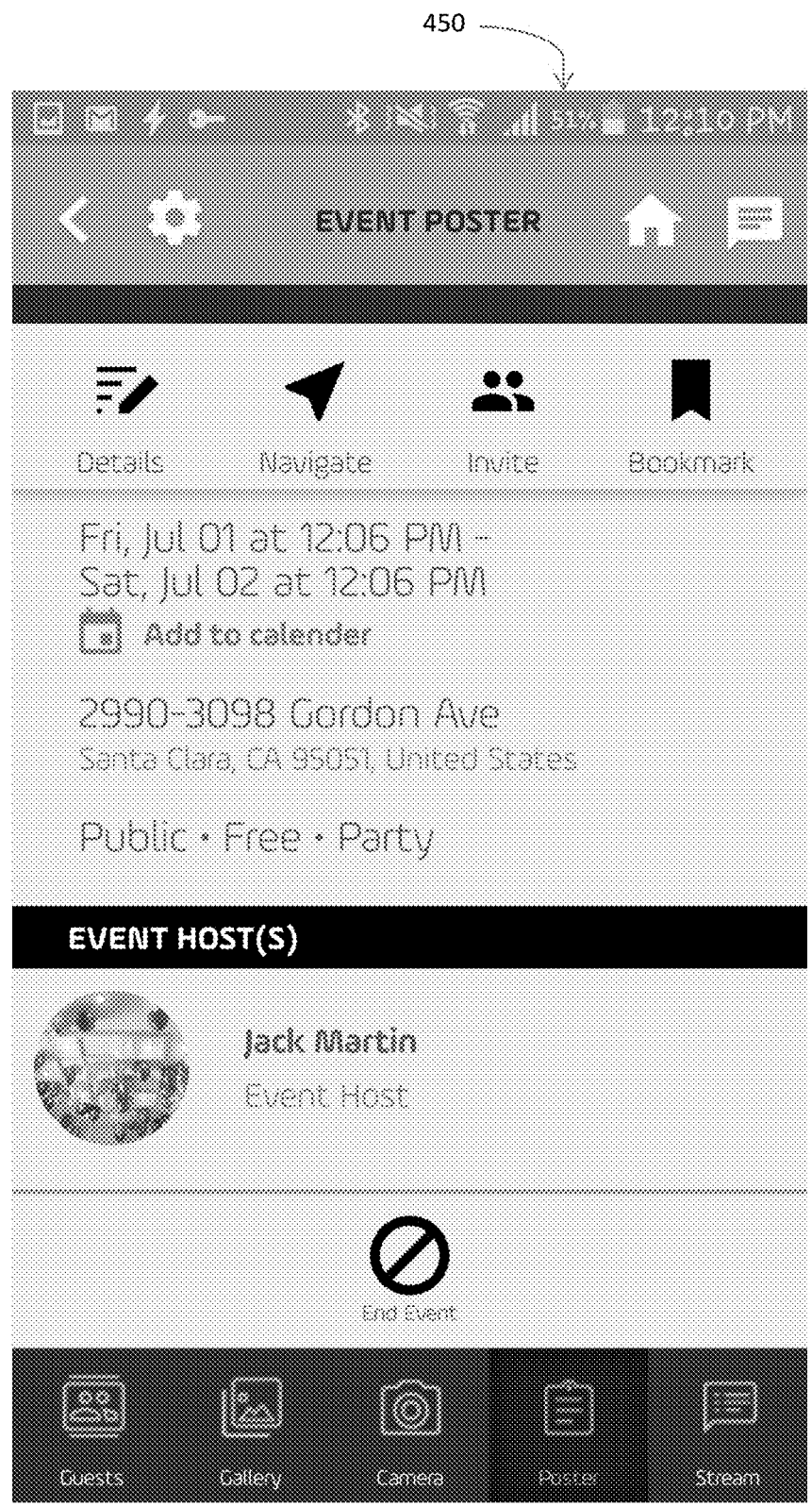
FIG. 35 illustrates another graphical representation of an embodiment of an event poster.

The Hooley events 440 of the Hooley System 100 may also include event posters 450. The event posters 450 may include information about the Hooley events 440 host, details of the Hooley events 440, a navigation button to navigate to the Hooley events 440, the ability to invite other guests, the ability to bookmark the Hooley events 440, and to end the Hooley events 440. An embodiment of the event posters 450 of the Hooley System 100 is shown in FIGS. 34 and 35. Guests of the Hooley events 440 may use the information in the event posters 450 to find the location of the Hooley events 440, to determine whether their friends are attending the Hooley events 440, and be able to access the Hooley events 440 quickly in the Hooley System 100.

Figure 36:
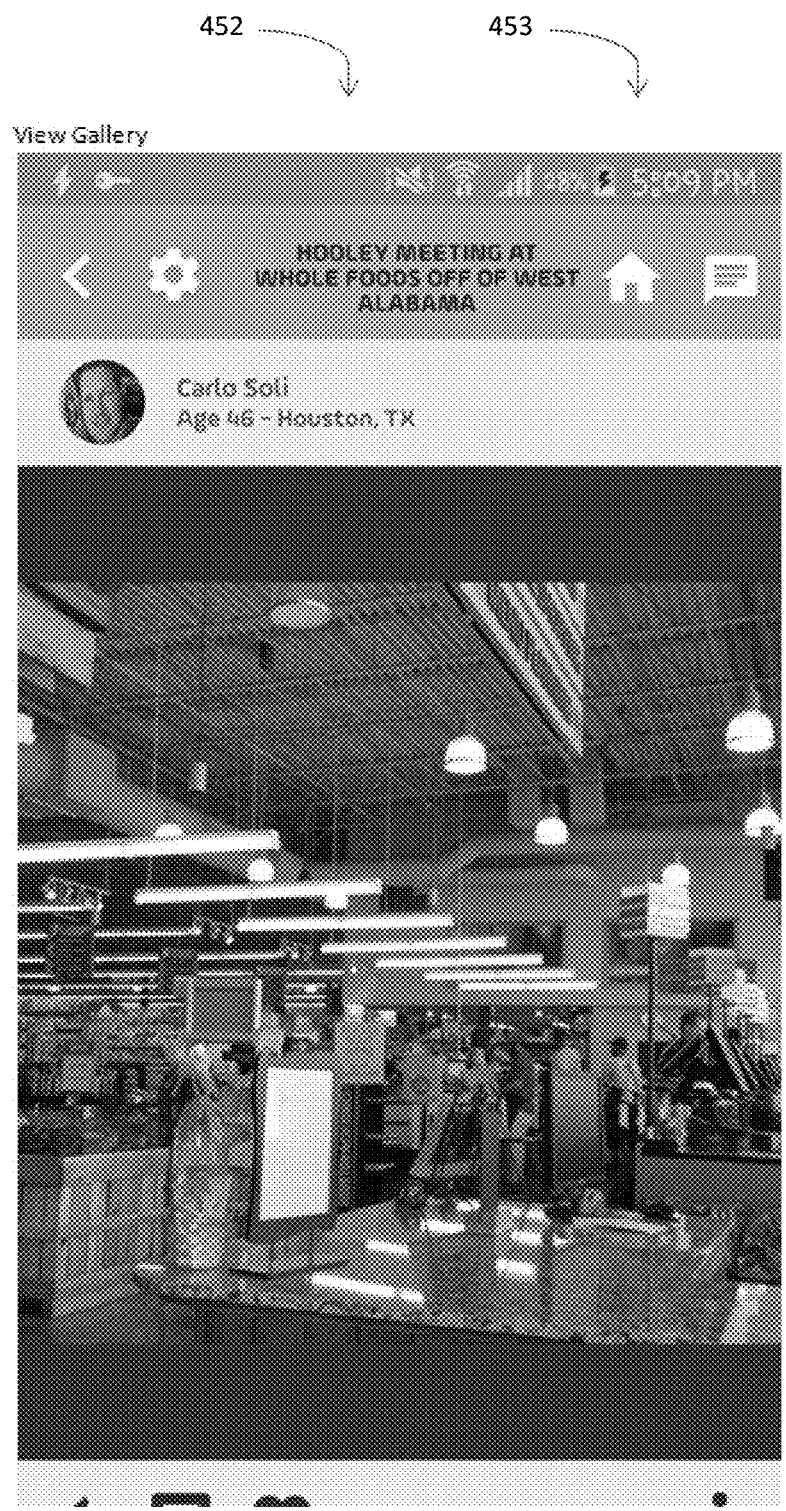
FIG. 36 illustrates a graphical representation of an embodiment of a gallery.

The event posters 450 may also include the galleries 452, which includes the ability to view the media content 453 (e.g., images, videos, clips, GIFs, etc.). Users of the Hooley System 100 may upload 451 the media content 453 onto the Hooley System 100 to be used by the Hooley events 440. Users of the Hooley System 100 may also "like" 454 and "comment" 455 on the media content 453 in the galleries 452 of the event posters 450. In FIG. 36, an embodiment of the galleries 452 and the media content 453 is shown.

Figure 37:
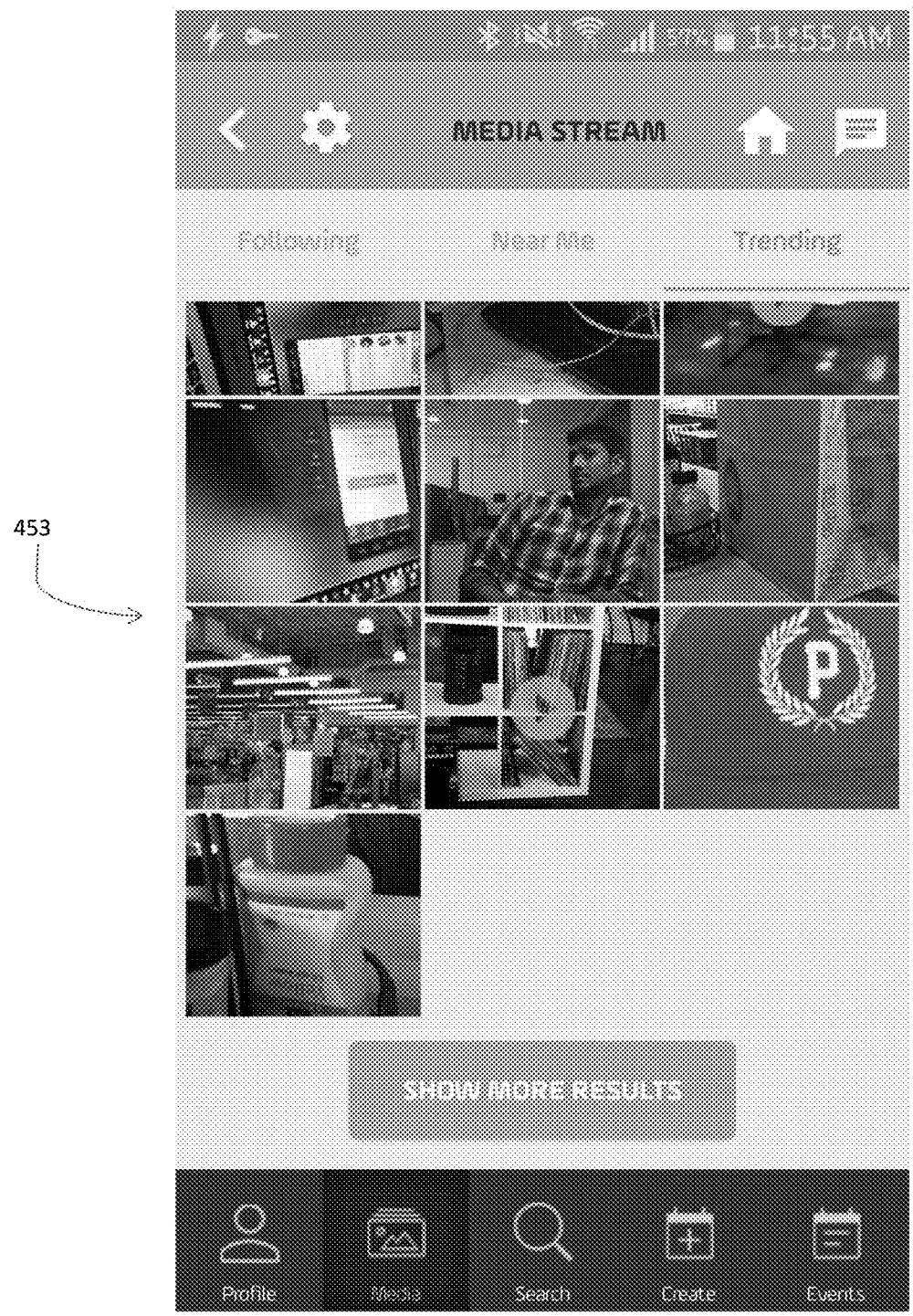
FIG. 37 illustrates a graphical representation of an embodiment of a media stream.

In FIG. 37, an embodiment of a media stream of the media content 453 of the Hooley System 100 is shown. The media stream may include media contact, including images and videos, from other users of the Hooley System 100 that the users are following, that are near the users, and of the other users that are trending at that particular point in time. The media stream of the media content 453 allows users of the Hooley System 100 to easily access the media content 453 of their friends and of guests at the Hooley events 440.

Figure 38:
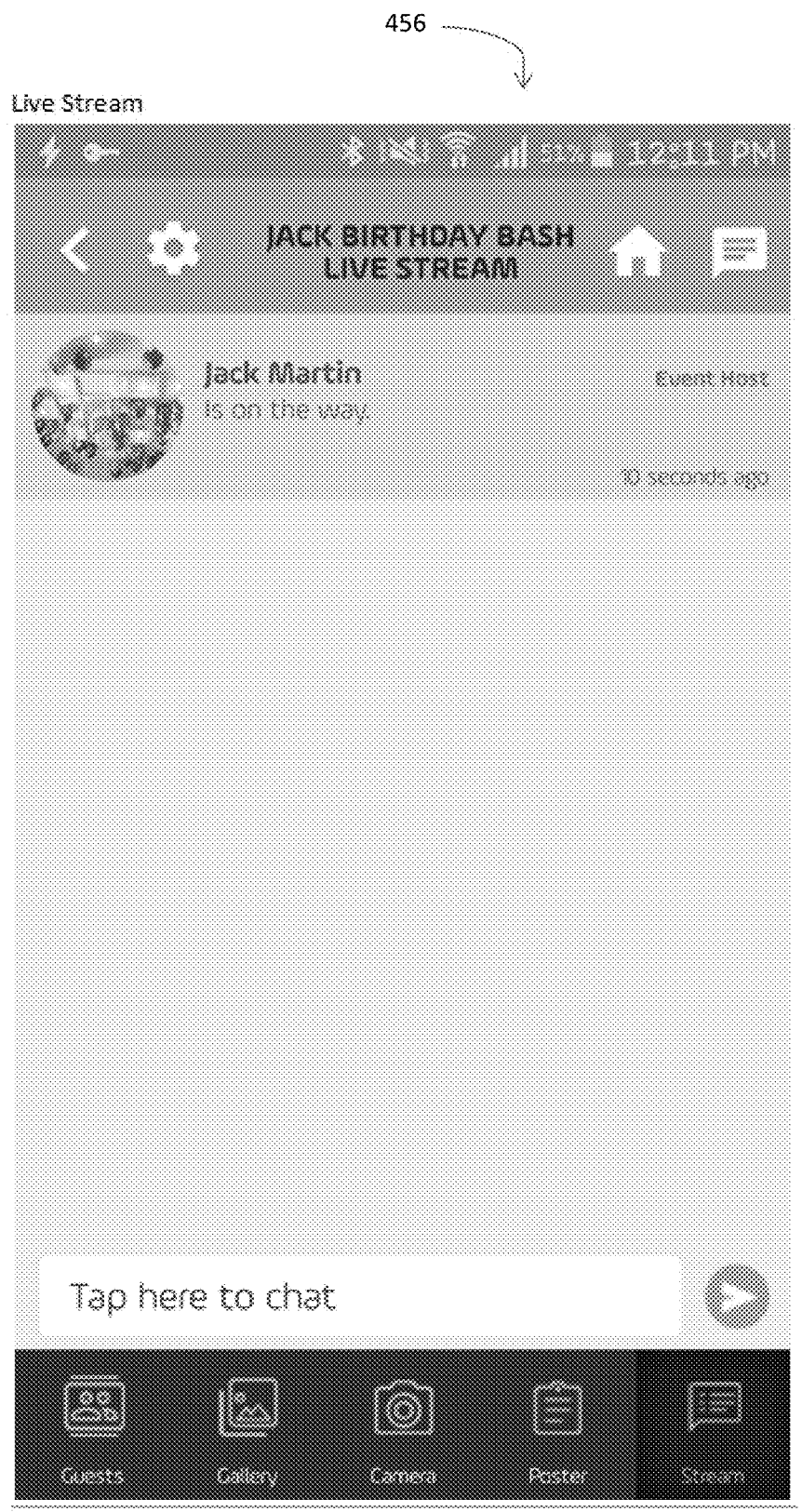
FIG. 38 illustrates a graphical representation of an embodiment of a live stream.

In FIG. 38, the Hooley events 440 of the Hooley System 100 may also include live streams 456. The live streams 456 of the Hooley System 100 may include information and media content that is related to the Hooley events 440. For example, the live streams 456 may include when users are on their way to the Hooley events 440, a countdown of when the Hooley events 440 will begin, and when media content is posted by guests of the Hooley System 100.

The guest lists 460 of the Hooley System 100 may also include the ability of the users to send friend requests 461, send direct messages 462 to other users in the guest lists 460, view guest profiles 463 of those users in the guest lists 460, block 464 other users in the guest lists 460, and join group chats 465 with other users of the Hooley events 440.

Figure 39:
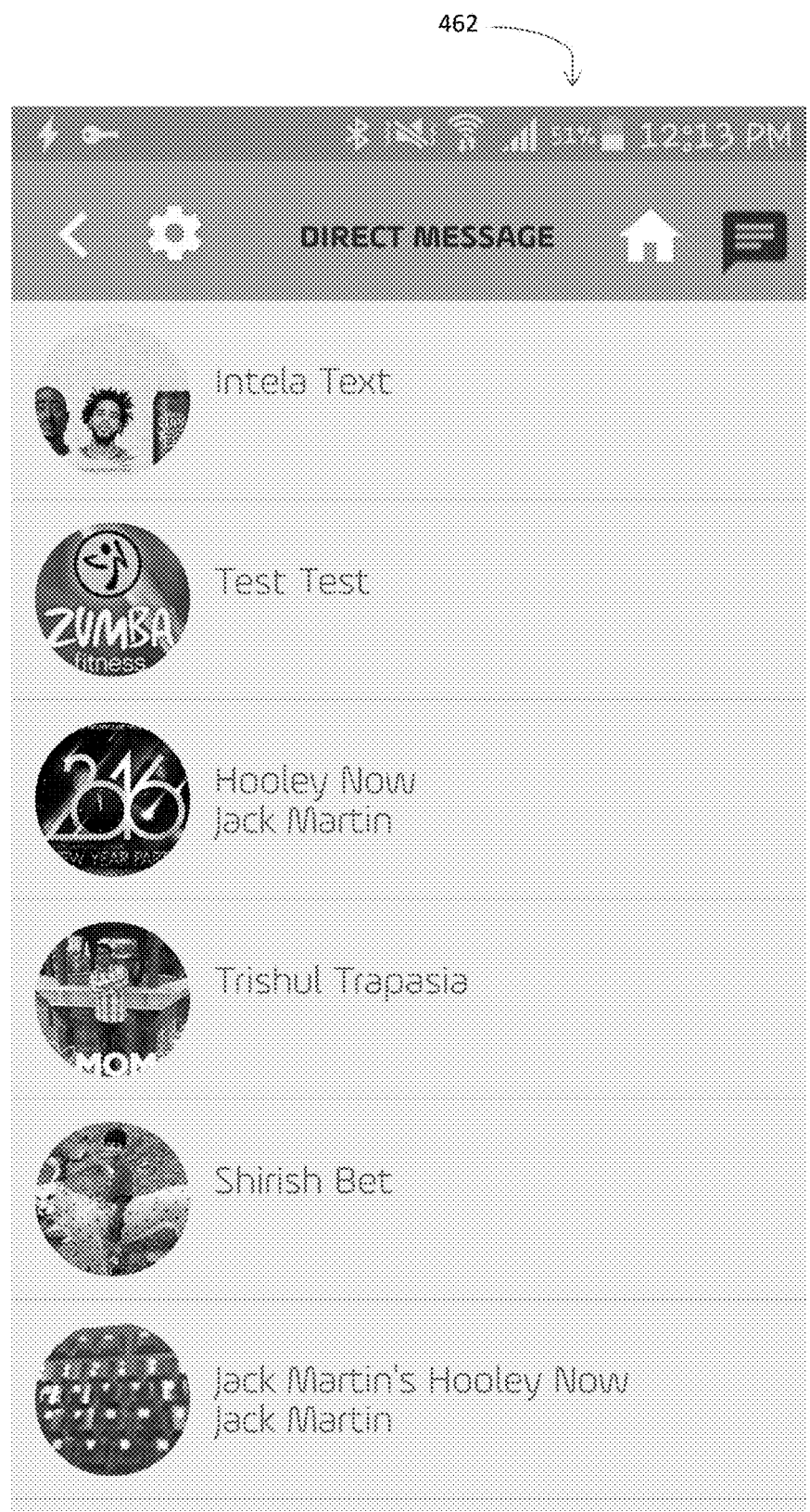
FIG. 39 illustrates a graphical representation of an embodiment of direct messaging.
Figure 40:
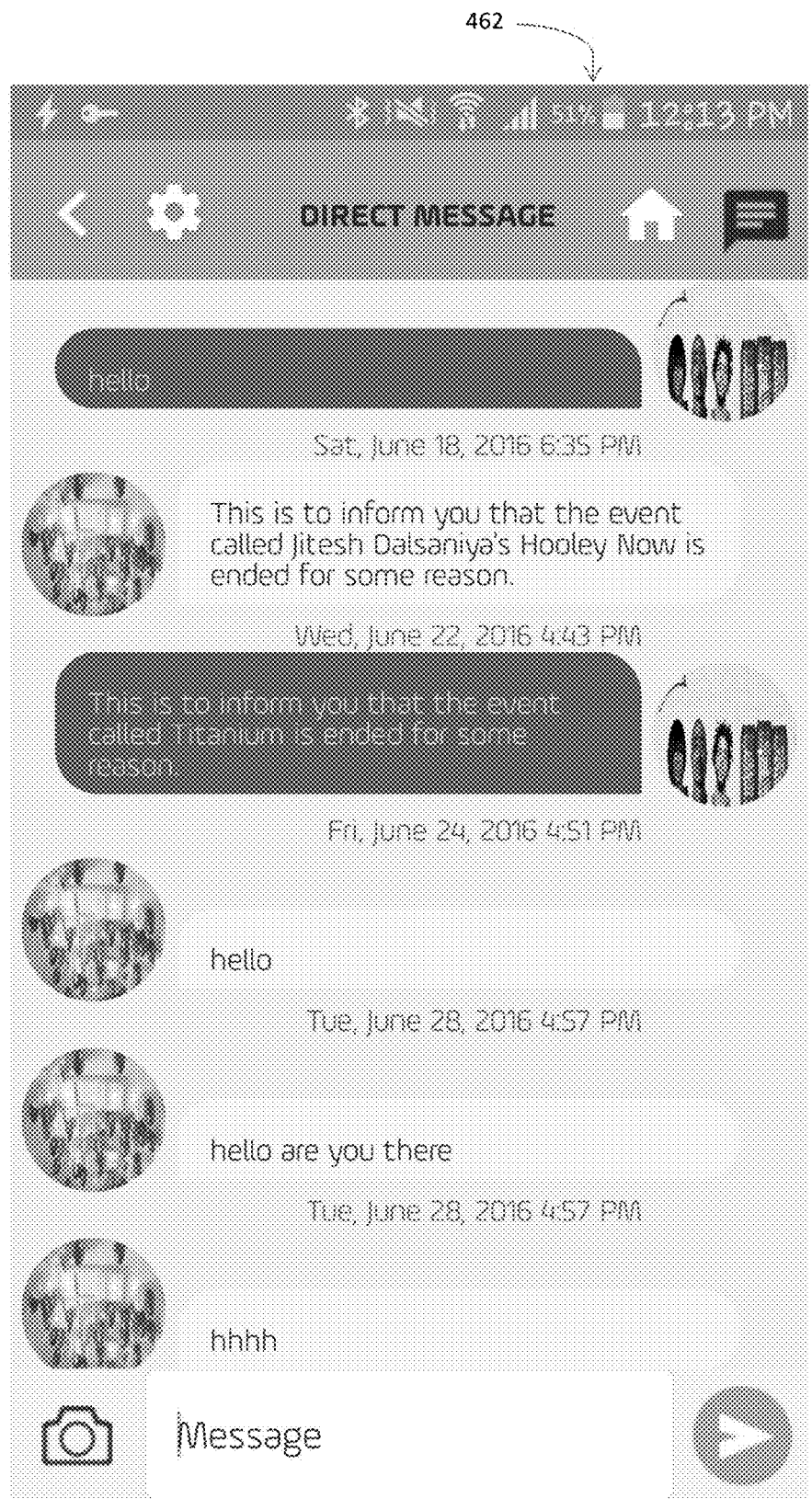
FIG. 40 illustrates another graphical representation of an embodiment of direct messaging.

In FIGS. 39 and 40, an embodiment of sending the direct messages 462 between the users of the Hooley System 100 and guests on the guest lists 460 is shown.

Once the Hooley events 440 are created by users of the Hooley System 100, the users can then begin to invite guests to the Hooley events 440. Once a guest of the Hooley System 100 accepts the invitation to join the Hooley events 440, the guest may be included in the guest lists 460. As a guest of the Hooley events 440, the guest may access certain information, including the Hooley events' 440 host information, location of the Hooley events 440, and a description of the Hooley events 440. However, not all information may be accessible by the guests of the Hooley events 440 at any given time. For example, sending the direct messages 462, viewing the guest profiles 463, and sending the friend requests 461 to other users of the Hooley events 440 may only be enabled when the guests of the Hooley events 440 are within the geo-fence of the Hooley events 440, as designated by the host of the Hooley events 440.

FIG. 41 depicts an embodiment of a flow diagram of a method 500 for guests of the Hooley System 100 according to the present invention. The method 500 begins by the guests logging into the Hooley System 100 at block 510. In block 520, the guests may begin browsing for the Hooley events in the Hooley System 100 in order to join the Hooley events. The Hooley events include both private and public Hooley events. If the Hooley events are public, the guests may join the public Hooley events by adding the public Hooley events to their list of "attending" Hooley events. If the Hooley events are private, the guests may submit a request to join the private Hooley events to the user of the Hooley events that created the Hooley events or is in control of the Hooley events. In block 530, once the guests have joined the Hooley events, the guests may be added to a "Guest List" of the Hooley events.

As described above, the Hooley events may include a start and end time and a start and end date. The Hooley events may also be "open-ended" and begin when the Hooley events are created and end at a predetermined time and date or end when the users that created the Hooley events closes the Hooley events. During the Hooley events, certain aspects of the Hooley System 100 may be available to the guests when the guests are within a geo-fence of the Hooley events. As described above, the geo-fence is determined by the users that created the Hooley events. In block 540, a determination may be made as to whether the guests are within the geo-fence of the Hooley events.

In block 560, if the guests are within the geo-fence of the Hooley events, the guests are added to a "Here Now" guest list of the Hooley events. In block 570, once the guests are on the "Here Now" guest list, the guest may be connected to other guests that are attending the Hooley events. The other guests at the Hooley events may also be informed that the guest has been added to the "Here Now" guest list. Once the guests are connected to the other guests that are attending the Hooley events, the guests may send friend requests 571 to the other guests at the Hooley events, send direct messages 572 to the other guests in attendance, view the other guests' profiles 573, and share media content 574 with the other guests within the geo-fence of the Hooley events.

Once the guests leave the geo-fence of the Hooley events (block 580), the guests may be placed on a "Gone" guest list of the Hooley events (block 590). In block 595, once the guests are on the "Gone" guest list, the other guests may be notified that the guests have left the geo-fence of the Hooley events. The guests may still access the other guests' information that are attending or have attended the Hooley events. For example, if the guests leave the geo-fence of the Hooley events, the guests may be able to send the friend requests 571 to the other guests at the Hooley events, send the direct messages 572 to the other guests in attendance, view the other guests' profiles 573, and share the media content 574 with the other guests that are within the geo-fence or was within the geo-fence of the Hooley events.

In block 550, if the guests do not enter the geo-fence of the Hooley events, the guests may have limited access to the other guests' information that are attending or have attended the Hooley events. For example, if the guests do not enter the geo-fence of the Hooley events, the guests may not send the friend requests 571 to the other guests at the Hooley events, send the direct messages 572 to the other guests in attendance, view the other guests' profiles 573, and share the media content 574 with the other guests attending or that have attended the Hooley events.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A method of allowing guests of events to interact with other guests of the events, the method comprising:
   logging, by a user of an event system, into the event system;
   creating, by the user of the event system, a user profile to be utilized in the event system;
   creating, by the user of the event system, an event, the event including a geo-fence surrounding a location of the event;
   customizing, by the user of the event system, the event to be a public event or a private event, the customizing of the event includes the user determining the geo-fence surrounding the location of the event, customizing by the user a name of the event, a start time, an end time, and a date of the event;
   creating, by the user of the event system, an event poster of the event, the event poster including details of the event, a location of the event, an ability to invite other users of the event system to the event, and an ability to bookmark the event;
   inviting, by the user of the event system, the other users of the event system to be guests of the event;
   determining a geo-location of the guests of the event;
   allowing the guests of the event to access features of the event when the geo-location of the guests is within the geo-fence of the event, the features of the event include at least one of direct messaging, guest profiles, and friend requests;
   receiving media content from the guests of the event, the media content including at least one of videos, images, and messages;
   organizing the media content into galleries for access by the guests of the event;
   continuing to allow the guests of the event full access or partial access to the features of the event and to the media content from the guests of the event after the guests of the event have left the geo-fence of the event; and
   allowing the guests of the event partial access to the features of the event and to the media content from the guests when the guests do not enter the geo-fence of the event.

2. The method of claim 1, wherein the event system is stored on a virtual machine of a server.

3. The method of claim 1, further comprising compiling status information of the guests of the event to determine which of the guests of the event have been invited, registered, "On The Way," "Here Now," and "Gone."

4. The method of claim 1, wherein the event is open to the public and begins at the creation of the event, the geo-location of the event being around a current geo-location of the user.

5. The method of claim 1, further comprising live streaming information about the event to the guests of the event.

6. A non-transitory computer-readable medium including code for performing a process to allow guests of events to interact with other guests of the events to be executed on a computer, the process comprising:

logging, by a user of an event system, into the event system;

creating, by the user of the event system, a user profile to be utilized in the event system;

creating, by the user of the event system, an event, the event including a geo-fence surrounding a location of the event;

customizing, by the user of the event system, the event to be a public event or a private event, the customizing of the event includes the user determining the geo-fence surrounding the location of the event, customizing by the user a name of the event, a start time, an end time, and a date of the event;

creating, by the user of the event system, an event poster of the event, the event poster including details of the event, a location of the event, an ability to invite other users of the event system to the event, and an ability to bookmark the event;

inviting, by the user of the event system, the other users of the event system to be guests of the event;

determining a geo-location of the guests of the event;

allowing the guests of the event to access features of the event when the geo-location of the guests is within the geo-fence of the event, the features of the event include at least one of direct messaging, guest profiles, and friend requests;

receiving media content from the guests of the event, the media content including at least one of videos, images, and messages; and organizing the media content into galleries for access by the guests of the event;

continuing to allow the guests of the event full access or partial access to the features of the event and to the media content from the guests of the event after the guests of the event have left the geo-fence of the event; and allowing the guests of the event partial access to the features of the event and to the media content from the guests when the guests do not enter the geo-fence of the event.

7. The non-transitory computer-readable medium of claim 6, wherein the event system is stored on a virtual machine of a server.

8. The non-transitory computer-readable medium of claim 6, further comprising compiling status information of the guests of the event to determine which of the guests of the event have been invited, registered, "On The Way," "Here Now," and "Gone."

9. The non-transitory computer-readable medium of claim 6, wherein the event is open to the public and begins at the creation of the event, the geo-location of the event being around a current geo-location of the user.

10. The non-transitory computer-readable medium of claim 6, further comprising live streaming information about the event to the guests of the event.

11. An event system for allowing guests of events to interact with other guests of the events, the system comprising:

at least one server, the at least one server including:

a hard drive; and a processor, the processor being configured to:

log, by a user of an event system, into the event system;

create, by the user of the event system, a user profile to be utilized in the event system;

create, by the user of the event system, an event, the event including a geo-fence surrounding a location of the event;

customize, by the user of the event system, the event to be a public event or a private event, the customizing of the event includes the user determining the geo-fence surrounding the location of the event, customizing by the user a name of the event, a start time, an end time, and a date of the event;

create, by the user of the event system, an event poster of the event, the event poster including details of the event, a location of the event, an ability to invite other users of the event system to the event, and an ability to bookmark the event;

invite, by the user of the event system, the other users of the event system to be guests of the event;

determine a geo-location of the guests of the event;

allow the guests of the event to access features of the event when the geo-location of the guests is within the geo-fence of the event, the features of the event include at least one of direct messaging, guest profiles, and friend requests;

receive media content from the guests of the event, the media content including at least one of videos, images, and messages; and organize the media content into galleries for access by the guests of the event;

continuing to allow the guests of the event full access or partial access to the features of the event and to the media content from the guests of the event after the guests of the event have left the geo-fence of the event; and allowing the guests of the event partial access to the features of the event and to the media content from the guests when the guests do not enter the geo-fence of the event.

12. The event system of claim 11, wherein the event system is stored on a virtual machine of the at least one server.

13. The event system of claim 11, wherein the processor is further configured to continue to allow the guests of the event to access the features of the event after the guests of the event have left the geo-fence of the event.

14. The event system of claim 11, wherein the processor is further configured to compile status information of the guests of the event to determine which of the guests of the event have been invited, registered, "On The Way," "Here Now," and "Gone."

15. The event system of claim 11, wherein the processor is further configured to live stream information about the event to the guests of the event.

* * * * *